United States Patent
Richard et al.

(10) Patent No.: US 9,892,370 B2
(45) Date of Patent: Feb. 13, 2018

(54) SYSTEMS AND METHODS FOR RESOLVING OVER MULTIPLE HIERARCHIES

(71) Applicant: SAS Institute Inc., Cary, NC (US)

(72) Inventors: Victor H Richard, Appleton, WI (US); Christian Haxholdt, Cary, NC (US); Glenn Good, Chicago, IL (US)

(73) Assignee: SAS INSTITUTE INC., Cary, NC (US)

( * ) Notice: Subject to any disclaimer, the term of this patent is extended or adjusted under 35 U.S.C. 154(b) by 287 days.

(21) Appl. No.: 14/750,886

(22) Filed: Jun. 25, 2015

(65) Prior Publication Data

US 2016/0171089 A1 Jun. 16, 2016

Related U.S. Application Data

(60) Provisional application No. 62/011,379, filed on Jun. 12, 2014.

(51) Int. Cl.
*G06F 7/00* (2006.01)
*G06F 17/30* (2006.01)
(Continued)

(52) U.S. Cl.
CPC ....... *G06Q 10/00* (2013.01); *G06F 17/30961* (2013.01); *G06Q 10/063* (2013.01); *G06Q 10/067* (2013.01); *G06Q 30/0202* (2013.01)

(58) Field of Classification Search
CPC ............. G06Q 30/0202; G06Q 10/067; G06Q 10/063; G06F 17/30587
See application file for complete search history.

(56) References Cited

U.S. PATENT DOCUMENTS 5,461,699 A 10/1995 Arbabi et al.
5,615,109 A 3/1997 Eder
(Continued)

FOREIGN PATENT DOCUMENTS

EP 2624171 A2 8/2013
WO 2002017125 A1 2/2002
WO 2005/124718 A2 12/2005

OTHER PUBLICATIONS

Notice of Allowance dated Apr. 1, 2016 for U.S. Appl. No. 14/948,970, 9 pages.
(Continued)

*Primary Examiner* — Charles E Lu
(74) *Attorney, Agent, or Firm* — Kilpatrick Townsend & Stockton LLP

(57) ABSTRACT

Techniques and systems for adjusting multiple hierarchies for consistency within levels of the hierarchies, using an optimization-based approach that results in an accurate projection across dimensions and levels in hierarchies. The systems and methods may include receiving data associated with nodes of two or more hierarchies, wherein nodes are associated with original node values, identifying a common level node and a target level node for each of the hierarchies, identifying a linking constraint, wherein the linking constraint includes a rule to a node from a hierarchy to make it consistent with a node from another hierarchy, applying the linking constraint to the common level node of each of the hierarchies, wherein applying the linking constraint includes generating updated common node values associated with the common level nodes, and wherein updated common node values are the same node values, applying the updated common node values to the target level node of each of the hierarchies, wherein applying the updated common node values includes generating updated target node values, and (Continued)

generating a resolved hierarchy using the updated target node values.

24 Claims, 11 Drawing Sheets

(51) Int. Cl.
G06Q 10/00 (2012.01)
G06Q 30/00 (2012.01)
G06Q 30/02 (2012.01)
G06Q 10/06 (2012.01)

(56) References Cited

U.S. PATENT DOCUMENTS

| | | |
|---|---|---|
| 5,870,746 A | 2/1999 | Knutson et al. |
| 5,918,232 A | 6/1999 | Pouschine et al. |
| 5,953,707 A | 9/1999 | Huang et al. |
| 5,991,740 A | 11/1999 | Messer |
| 5,995,943 A | 11/1999 | Bull et al. |
| 6,052,481 A | 4/2000 | Grajski et al. |
| 6,128,624 A | 10/2000 | Papierniak et al. |
| 6,151,584 A | 11/2000 | Papierniak et al. |
| 6,169,534 B1 | 1/2001 | Raffel et al. |
| 6,189,029 B1 | 2/2001 | Fuerst |
| 6,208,975 B1 | 3/2001 | Bull et al. |
| 6,216,129 B1 | 4/2001 | Eldering |
| 6,223,173 B1 | 4/2001 | Wakio et al. |
| 6,230,064 B1 | 5/2001 | Nakase et al. |
| 6,286,005 B1 | 9/2001 | Cannon |
| 6,308,162 B1 | 10/2001 | Ouimet et al. |
| 6,317,731 B1 | 11/2001 | Luciano |
| 6,334,110 B1 | 12/2001 | Walter et al. |
| 6,356,842 B1 | 3/2002 | Intriligator et al. |
| 6,397,166 B1 | 5/2002 | Leung et al. |
| 6,400,853 B1 | 6/2002 | Shiiyama |
| 6,526,405 B1 | 2/2003 | Mannila et al. |
| 6,539,392 B1 | 3/2003 | Rebane |
| 6,542,869 B1 | 4/2003 | Foote |
| 6,564,190 B1 | 5/2003 | Dubner |
| 6,591,255 B1 | 7/2003 | Tatum et al. |
| 6,609,085 B1 | 8/2003 | Uemura et al. |
| 6,611,726 B1 | 8/2003 | Crosswhite |
| 6,640,227 B1 | 10/2003 | Andreev |
| 6,735,738 B1 | 5/2004 | Kojima |
| 6,748,374 B1 | 6/2004 | Madan et al. |
| 6,775,646 B1 | 8/2004 | Tufillaro et al. |
| 6,792,399 B1 | 9/2004 | Phillips et al. |
| 6,850,871 B1 | 2/2005 | Barford et al. |
| 6,876,988 B2 | 4/2005 | Helsper et al. |
| 6,878,891 B1 | 4/2005 | Josten et al. |
| 6,928,398 B1 | 8/2005 | Fang et al. |
| 6,978,249 B1 | 12/2005 | Beyer et al. |
| 7,072,863 B1 | 7/2006 | Phillips et al. |
| 7,080,026 B2 | 7/2006 | Singh et al. |
| 7,103,222 B2 | 9/2006 | Peker |
| 7,130,822 B1 | 10/2006 | Their et al. |
| 7,130,833 B2 | 10/2006 | Their et al. |
| 7,152,068 B2 | 12/2006 | Emery et al. |
| 7,171,340 B2 | 1/2007 | Brocklebank |
| 7,194,434 B2 | 3/2007 | Piccioli |
| 7,216,088 B1 | 5/2007 | Chappel et al. |
| 7,222,082 B1 | 5/2007 | Adhikari et al. |
| 7,236,940 B2 | 6/2007 | Chappel |
| 7,240,019 B2 | 7/2007 | Delurgio et al. |
| 7,251,589 B1 | 7/2007 | Crowe et al. |
| 7,260,550 B1 | 8/2007 | Notani |
| 7,280,986 B2 | 10/2007 | Goldberg et al. |
| 7,433,809 B1 | 10/2008 | Guirguis |
| 7,433,834 B2 | 10/2008 | Joao |
| 7,454,420 B2 | 11/2008 | Ray et al. |
| 7,516,084 B1* | 4/2009 | Sankaran .......... G06F 17/30392 705/7.31 |
| 7,523,048 B1 | 4/2009 | Dvorak |
| 7,530,025 B2 | 5/2009 | Ramarajan et al. |
| 7,565,417 B2 | 7/2009 | Rowady, Jr. |
| 7,570,262 B2 | 8/2009 | Landau et al. |
| 7,610,214 B1 | 10/2009 | Dwarakanath et al. |
| 7,617,167 B2 | 11/2009 | Griffis et al. |
| 7,624,114 B2 | 11/2009 | Paulus et al. |
| 7,660,734 B1 | 2/2010 | Neal et al. |
| 7,660,823 B2 | 2/2010 | Clover |
| 7,664,618 B2 | 2/2010 | Cheung et al. |
| 7,689,456 B2 | 3/2010 | Schroeder et al. |
| 7,693,737 B2 | 4/2010 | Their et al. |
| 7,702,482 B2 | 4/2010 | Graepel et al. |
| 7,711,734 B2 | 5/2010 | Leonard et al. |
| 7,716,022 B1 | 5/2010 | Park et al. |
| 7,774,179 B2 | 8/2010 | Guirguis |
| 7,941,413 B2 | 5/2011 | Kashiyama et al. |
| 7,966,322 B2 | 6/2011 | Clover |
| 8,005,707 B1 | 8/2011 | Jackson et al. |
| 8,010,324 B1 | 8/2011 | Crowe et al. |
| 8,010,404 B1 | 8/2011 | Wu et al. |
| 8,014,983 B2 | 9/2011 | Crowe et al. |
| 8,015,133 B1 | 9/2011 | Wu et al. |
| 8,087,001 B2 | 12/2011 | Hoyek et al. |
| 8,112,302 B1* | 2/2012 | Trovero .......... G06Q 10/00 705/7.11 |
| 8,321,479 B2 | 11/2012 | Bley |
| 8,326,677 B1 | 12/2012 | Fan et al. |
| 8,364,517 B2 | 1/2013 | Trovero et al. |
| 8,374,903 B2 | 2/2013 | Little |
| 8,489,622 B2 | 7/2013 | Joshi et al. |
| 8,515,835 B2 | 8/2013 | Wu et al. |
| 8,631,040 B2 | 1/2014 | Jackson et al. |
| 8,645,421 B2 | 2/2014 | Meric et al. |
| 8,676,629 B2 | 3/2014 | Chien et al. |
| 8,768,866 B2 | 7/2014 | Desai |
| 9,208,209 B1 | 12/2015 | Leonard et al. |
| 2002/0169657 A1 | 11/2002 | Singh et al. |
| 2002/0169658 A1 | 11/2002 | Adler |
| 2003/0101009 A1 | 5/2003 | Seem |
| 2003/0105660 A1 | 6/2003 | Walsh et al. |
| 2003/0110016 A1 | 6/2003 | Stefek et al. |
| 2003/0154144 A1 | 8/2003 | Pokorny et al. |
| 2003/0187719 A1 | 10/2003 | Brocklebank |
| 2003/0200134 A1 | 10/2003 | Leonard et al. |
| 2003/0212590 A1 | 11/2003 | Klingler |
| 2004/0030667 A1 | 2/2004 | Xu et al. |
| 2004/0041727 A1 | 3/2004 | Ishii et al. |
| 2004/0138942 A1* | 7/2004 | Pearson .......... G06Q 10/06 705/7.11 |
| 2004/0172225 A1 | 9/2004 | Hochberg et al. |
| 2004/0230470 A1 | 11/2004 | Svilar et al. |
| 2005/0102107 A1 | 5/2005 | Porikli |
| 2005/0114391 A1 | 5/2005 | Corcoran et al. |
| 2005/0159997 A1 | 7/2005 | John |
| 2005/0177351 A1 | 8/2005 | Goldberg et al. |
| 2005/0209732 A1 | 9/2005 | Audimoolam et al. |
| 2005/0055275 A1 | 10/2005 | Newman et al. |
| 2005/0249412 A1 | 11/2005 | Radhakrishnan et al. |
| 2005/0271156 A1 | 12/2005 | Nakano |
| 2006/0063156 A1 | 3/2006 | Willman et al. |
| 2006/0064181 A1 | 3/2006 | Kato |
| 2006/0085380 A1 | 4/2006 | Cote et al. |
| 2006/0112028 A1 | 5/2006 | Xiao et al. |
| 2006/0143081 A1 | 6/2006 | Argaiz |
| 2006/0164997 A1 | 7/2006 | Graepel et al. |
| 2006/0241923 A1 | 10/2006 | Xu et al. |
| 2006/0247900 A1 | 11/2006 | Brocklebank |
| 2007/0011175 A1 | 1/2007 | Langseth et al. |
| 2007/0055604 A1 | 3/2007 | Their et al. |
| 2007/0094168 A1 | 4/2007 | Ayala et al. |
| 2007/0118491 A1 | 5/2007 | Baum et al. |
| 2007/0208608 A1 | 6/2007 | Amerasinghe et al. |
| 2007/0162301 A1 | 7/2007 | Sussman et al. |
| 2007/0203783 A1 | 8/2007 | Beltramo |
| 2007/0208492 A1 | 9/2007 | Downs et al. |
| 2007/0106550 A1 | 10/2007 | Umblijs et al. |
| 2007/0291958 A1 | 12/2007 | Jehan |
| 2008/0040202 A1 | 2/2008 | Walser et al. |
| 2008/0208832 A1 | 8/2008 | Friedlander et al. |

(56) References Cited

U.S. PATENT DOCUMENTS

| | | |
|---|---|---|
| 2008/0288537 A1 | 11/2008 | Golovchinsky et al. |
| 2008/0294651 A1 | 11/2008 | Masuyama et al. |
| 2009/0018996 A1 | 1/2009 | Hunt et al. |
| 2009/0099988 A1 | 4/2009 | Stokes et al. |
| 2009/0172035 A1 | 7/2009 | Lessing et al. |
| 2009/0216611 A1 | 8/2009 | Leonard et al. |
| 2009/0319310 A1 | 12/2009 | Little |
| 2010/0030521 A1 | 2/2010 | Akhrarov et al. |
| 2010/0063974 A1 | 3/2010 | Papadimitriou et al. |
| 2010/0106561 A1* | 4/2010 | Peredriy ............... G06Q 10/04 705/7.31 |
| 2010/0114899 A1 | 5/2010 | Guha et al. |
| 2010/0121868 A1 | 5/2010 | Biannic et al. |
| 2010/0257133 A1 | 10/2010 | Crowe et al. |
| 2011/0106723 A1 | 5/2011 | Chipley et al. |
| 2011/0119374 A1 | 5/2011 | Ruhl et al. |
| 2011/0145223 A1 | 6/2011 | Cormode et al. |
| 2011/0208701 A1 | 8/2011 | Jackson et al. |
| 2011/0307503 A1 | 12/2011 | Dlugosch |
| 2012/0053989 A1* | 3/2012 | Richard ............. G06Q 30/0202 705/7.31 |
| 2012/0123994 A1 | 5/2012 | Lowry et al. |
| 2012/0310939 A1 | 12/2012 | Lee et al. |
| 2013/0024167 A1 | 1/2013 | Blair et al. |
| 2013/0024173 A1 | 1/2013 | Brzezicki et al. |
| 2013/0238399 A1 | 9/2013 | Chipley et al. |
| 2013/0268318 A1 | 10/2013 | Richard |
| 2014/0019088 A1 | 1/2014 | Leonard et al. |
| 2014/0019448 A1 | 1/2014 | Leonard et al. |
| 2014/0019909 A1 | 1/2014 | Leonard et al. |
| 2014/0032506 A1* | 1/2014 | Hoey ............... G06F 17/30303 707/691 |
| 2014/0257778 A1 | 9/2014 | Leonard et al. |
| 2015/0052173 A1 | 2/2015 | Leonard et al. |
| 2015/0120269 A1* | 4/2015 | Dannecker .......... G06F 17/5009 703/18 |
| 2016/0005055 A1 | 1/2016 | Sarferaz |
| 2016/0042101 A1 | 2/2016 | Yoshida |

OTHER PUBLICATIONS

Aiolfi, Marco et al., "Forecast Combinations," CREATES Research Paper 2010-21, School of Economics and Management, Aarhus University, 35 pp. (May 6, 2010).

Automatic Forecasting Systems Inc., Autobox 5.0 for Windows User's Guide, 82 pp. (1999).

Choudhury, J. Paul et al., "Forecasting of Engineering Manpower Through Fuzzy Associative Memory Neural Network with ARIMA: A Comparative Study", Neurocomputing, vol. 47, Iss. 1-4, pp. 241-257 (Aug. 2002).

Costantini, Mauro et al., "Forecast Combination Based on Multiple Encompassing Tests in a Macroeconomic DSGE System," Reihe Okonomie/ Economics Series 251, 24 pp. (May 2010).

Data Mining Group, available at http://www.dmg.org, printed May 9, 2005, 3 pp.

Funnel Web, Web site Analysis. Report, Funnel Web Demonstration, Authenticated Users History, http://www.quest.com/funnel.sub.—web/analyzer/sample/UserHist.html (1 pg.), Mar. 2002.

Funnel Web, Web site Analysis Report, Funnel Web Demonstration, Clients History, http://www/quest.com/funnel.sub.—web/analyzer/sample.ClientHist- .html (2 pp.), Mar. 2002.

Garavaglia, Susan et al., "A Smart Guide to Dummy Variables: Four Applications and a Macro," accessed from: http://web.archive.org/web/20040728083413/http://www.ats.ucla.edu/stat/sa- s/library/nesug98/p046.pdf, (2004).

Guerard John B. Jr., Automatic Time Series Modeling, Intervention Analysis, and Effective Forecasting. (1989) Journal of Statistical Computation and Simulation, 1563-5163, vol. 34, Issue 1, pp. 43-49.

Guralnik, V. and Srivastava, J., Event Detection from Time Series Data (1999), Proceedings of the 5th ACM SIGKDD International Conference on Knowledge Discovery and Data Mining, pp. 33-42.

Harrison, H.C. et al., "An Intelligent Business Forecasting System", ACM Annual Computer Science Conference, pp. 229-236 (1993).

Harvey, Andrew, "Forecasting with Unobserved Components Time Series Models," Faculty of Economics, University of Cambridge, Prepared for Handbook of Economic Forecasting, pp. 1-89 (Jul. 2004).

Jacobsen, Erik et al., "Assigning Confidence to Conditional Branch Predictions", IEEE, Proceedings of the 29th Annual International Symposium on Microarchitecture, 12 pp. (Dec. 2-4, 1996).

Keogh, Eamonn J. et al., "Derivative Dynamic Time Warping", In First SIAM International Conference on Data Mining (SDM'2001), Chicago, USA, pp. 1-11 (2001).

Kobbacy, Khairy A.H., et al., Abstract, "Towards the development of an intelligent inventory management system," Integrated Manufacturing Systems, vol. 10, Issue 6, (1999) 11 pp.

Kumar, Mahesh, "Combining Forecasts Using Clustering", Rutcor Research Report 40-2005, cover page and pp. 1-16 (Dec. 2005).

Leonard, Michael et al., "Mining Transactional and Time Series Data", abstract and presentation, International Symposium of Forecasting, 23 pp. (2003).

Leonard, Michael et al., "Mining Transactional and Time Series Data", abstract, presentation and paper, SUGI, 142 pp. (Apr. 10-13, 2005).

Leonard, Michael, "Large-Scale Automatic Forecasting Using Inputs and Calendar Events", abstract and presentation, International Symposium on Forecasting Conference, 56 pp. (Jul. 4-7, 2004).

Leonard, Michael, "Large-Scale Automatic Forecasting Using Inputs and Calendar Events", White Paper, pp. 1-27 (2005).

Leonard, Michael, "Large-Scale Automatic Forecasting: Millions of Forecasts", abstract and presentation, International Symposium of Forecasting, 156 pp. (2002).

Leonard, Michael, "Predictive Modeling Markup Language for Time Series Models", abstract and presentation, International Symposium on Forecasting Conference, 35 pp. (Jul. 4-7, 2004).

Leonard, Michael, "Promotional Analysis and Forecasting for Demand Planning: A Practical Time Series Approach", with exhibits 1 and 2, SAS Institute Inc., Cary, North Carolina, 50 pp. (2000).

Lu, Sheng et al., "A New Algorithm for Linear and Nonlinear ARMA Model Parameter Estimation Using Affine Geometry", IEEE Transactions on Biomedical Engineering, vol. 48, No. 10, pp. 1116-1124 (Oct. 2001).

Malhotra, Manoj K. et al., "Decision making using multiple models", European Journal of Operational Research, 114, pp. 1-14 (1999).

McQuarrie, Allan D.R. et al., "Regression and Time Series Model Selection", World Scientific Publishing Co. Pte. Ltd., 40 pp. (1998).

Oates, Tim et al., "Clustering Time Series with Hidden Markov Models and Dynamic Time Warping", Computer Science Department, LGRC University of Massachusetts, in Proceedings of the IJCAI-99, 5 pp. (1999).

Park, Kwan Hee, Abstract "Development and evaluation of a prototype expert system for forecasting models", Mississippi State University, 1990, 1 pg.

Product Brochure, Forecast PRO, 2000, 12 pp.

Quest Software, "Funnel Web Analyzer: Analyzing the Way Visitors Interact with Your Web Site", http://www.quest.com/funnel.sub.—web/analyzer (2 pp.), Mar. 2002.

Safavi, Alex "Choosing the right forecasting software and system." The Journal of Business Forecasting Methods & Systems 19.3 (2000): 6-10. ABI/INFORM Global, ProQuest.

SAS Institute Inc., SAS/ETS User's Guide, Version 8, Cary NC; SAS Institute Inc., (1999) 1543 pages.

Seasonal Dummy Variables, Mar. 2004, http://shazam.econ.ubc.ca/intro/dumseas.htm, Accessed from: http://web.archive.org/web/20040321055948/http://shazam.econ.ubc.ca/intro-/dumseas.htm.

Simoncelli, Eero, "Least Squares Optimization," Center for Neural Science, and Courant Institute of Mathematical Sciences, pp. 1-8 (Mar. 9, 2005).

Tashman, Leonard J. et al., Abstract "Automatic Forecasting Software: A Survey and Evaluation", International Journal of Forecasting, vol. 7, Issue 2, Aug. 1991, 1 pg.

(56) References Cited

OTHER PUBLICATIONS

Using Predictor Variables, (1999) SAS OnlineDoc: Version 8, pp. 1325-1349, Accessed from: http://www.okstate.edu/sas/v8/saspdf/ets/chap27.pdf.

van Wijk, Jarke J. et al., "Cluster and Calendar based Visualization of Time Series Data", IEEE Symposium on Information Visualization (INFOVIS '99), San Francisco, pp. 1-6 (Oct. 25-26, 1999).

Vanderplaats, Garret N., "Numerical Optimization Techniques for Engineering Design", Vanderplaats Research & Development (publisher), Third Edition, 18 pp. (1999).

Wang, Liang et al., "An Expert System for Forecasting Model Selection", IEEE, pp. 704-709 (1992).

Atuk, Oguz et al., "Seasonal Adjustment in Economic Time Series," Statistics Department, Discussion Paper No. 2002/1, Central Bank of the Republic of Turkey, Central Bank Review, 15 pp. (2002).

Babu, G., "Clustering in non-stationary environments using a clan-based evolutionary approach," Biological Cybernetics, Sep. 7, 1995, Springer Berlin I Heidelberg, pp. 367-374, vol. 73, Issue: 4.

Bruno, Giancarlo et al., "The Choice of Time Intervals in Seasonal Adjustment: A Heuristic Approach," Institute for Studies and Economic Analysis, Rome Italy, 14 pp. (2004).

Bruno, Giancarlo et al., "The Choice of Time Intervals in Seasonal Adjustment: Characterization and Tools," Institute for Studies and Economic Analysis, Rome, Italy, 21 pp. (Jul. 2001).

Bradley, D.C. et al., "Quantitation of measurement error with Optimal Segments: basis for adaptive time course smoothing," Am J Physiol Endocrinol Metab Jun. 1, 1993 264:(6) E902-E911.

Huang, N. E. et al.,"Applications of Hilbert-Huang transform to non-stationary financial time series analysis." Appl. Stochastic Models Bus. Ind., 19: 245-268 (2003).

IBM, "IBM Systems, IBM PowerExecutive Installation and User's Guide," Version 2.10, 62 pp. (Aug. 2007).

Kalpakis, K. et al., "Distance measures for effective clustering of ARIMA time-series,"Data Mining, 2001. ICDM 2001, Proceedings IEEE International Conference on, vol., No., pp. 273-280, 2001.

Keogh, E. et al., "An online algorithm for segmenting time series," Data Mining, 2001, ICDM 2001, Proceedings IEEE International Conference on , vol., No., pp. 289-296, 2001.

Keogh, Eamonn et al., "Segmenting Time Series: A Survey and Novel Approach," Department of Information and Computer Science, University of California, Irvine, California 92697, 15 pp. (2004).

Palpanas, T. et al, "Online amnesic approximation of streaming time series," Data Engineering, 2004. Proceedings. 20th International Conference on , vol., No., pp. 339-349, Mar. 30-Apr. 2, 2004.

Wang Xiao-Ye; Wang Zheng-Ou; "A structure-adaptive piece-wise linear segments representation for time series," Information Reuse and Integration, 2004. IR I 2004. Proceedings of the 2004 IEEE International Conference on , vol., No., pp. 433-437, Nov. 8-10, 2004.

Yu, Lean et al., "Time Series Forecasting with Multiple Candidate Models: Selecting or Combining?" Journal of System Science and Complexity, vol. 18, No. 1, pp. 1-18 (Jan. 2005).

Wang, Ming-Yeu et al., "Combined forecast process: Combining scenario analysis with the technological substitution model," Technological Forecasting and Social Change, vol. 74, pp. 357-378 (2007).

Green, Kesten C. et al., "Structured analogies for forecasting" International Journal of Forecasting, vol. 23, pp. 365-376 (2007).

Agarwal, Deepak et al., "Efficient and Effective Explanation of Change in Hierarchical Summaries", The $13^{th}$ International Conference on Knowledge Discovery and Data Mining 2007, Aug. 12-15, 2007 (10 pages).

Hyndman, Rob J. et al., "Optimal combination forecasts for hierarchical time series", Monash University, Department of Econometrics and Business Statistics, http://www.buseco.monash.edu.au/de)Its/ebs/pubs/w)lapers/ (2007) 23 pages.

SAS Institute Inc., SAS/QC 9.1: User's Guide. Cary, NC: SAS Publications, (2004).

SAS Institute Inc., SAS/QC 13.2 User's Guide. Cary, NC: SAS Publications, (2014).

Wheeler, Donald J., and David S. Chambers. Understanding Statistical Process Control. 2nd ed. Knoxville, Tenn.: SPC Press, 1992.

Wheeler, Donald J. Advanced Topics in Statistical Process Control. Knoxville, Tenn.: SPC Press, 1995.

Montgomery, Douglas C. Introduction to Statistical Quality Control. 6th ed. Hoboken, N.J.: Wiley, 2009.

Cecil Bozarth, Ph.D., Measuring Forecast Accuracy: Approaches to Forecasting : A Tutorial, Published Jan. 25, 2011, 3 pages.

Davis Aquilano Chase, Fundamentals of Operations Management, Chapter 9 Forecasting, The McGraw-Hill Companies, Inc. 2003, 42 pages.

DataNet Quality Systems, What are the Western Electric Rules, http://www.winspc.com/14-datanet-quality-systems/support-a-resources/179-what-are-the-western-electric-rules, (available online Apr. 14, 2014).

First Action Interview Pilot Program Pre-Interview Communication dated Jun. 12, 2015 for U.S. Appl. No. 14/668,854, 6 pages.

Notice of Allowance dated Oct. 5, 2015 for U.S. Appl. No. 14/668,854; 10 pages.

* cited by examiner

SYSTEMS AND METHODS FOR RESOLVING OVER MULTIPLE HIERARCHIES

CROSS-REFERENCE TO RELATED APPLICATIONS

This is a non-provisional of and claims the benefit and priority under 35 U.S.C. § 119(e) of U.S. Provisional App. No. 62/011,379. That U.S. Provisional application was filed on Jun. 12, 2014, and is incorporated by reference herein for all purposes.

FIELD

The present disclosure relates to resolving over multiple hierarchies. Specifically, various techniques and systems are provided for adjusting multiple hierarchies for consistency within levels of the hierarchies, using an optimization-based approach that results in an accurate projection across dimensions and levels in hierarchies.

BRIEF SUMMARY

The present disclosure relates to resolving over multiple hierarchies. Specifically, various techniques and systems are provided for adjusting multiple hierarchies for consistency within levels of the hierarchies, using an optimization-based approach that results in an projection across dimensions and levels in hierarchies. In an embodiment, a computer-program product may be tangibly embodied in a non-transitory machine-readable storage medium. The non-transitory machine-readable storage medium may include instructions configured to cause a data processing apparatus to receive data associated with nodes of two or more hierarchies, wherein nodes are associated with original node values, identify a common level node and a target level node for each of the hierarchies, identify a linking constraint, wherein the linking constraint includes a rule to adjust a node from a hierarchy to make it consistent with a node from another hierarchy, apply the linking constraint to the common level node of each of the hierarchies, wherein applying the linking constraint includes generating updated common node values associated with the common level nodes, and wherein updated common node values are the same node values, apply the updated common node values to the target level node of each of the hierarchies, wherein applying the updated common node values includes generating updated target node values, and generate a resolved hierarchy using the updated target node values.

In an aspect, the updated common node values have the same value as a value of one of the common level nodes before the linking constraint is applied to the common level node of each of the hierarchies. In another aspect, the computer-program product may further comprise instructions configured to cause the data processing apparatus to compute a change in target node value associated with each of the two or more hierarchies, determine that the change in target node value associated with one or more of the hierarchies are above a predetermined threshold, and re-apply the linking constraint to the common level node of each of the hierarchies, wherein applying the linking constraint includes generating alternative common node values associated with the common level nodes, wherein the alternative common node values are the same node values, and wherein the alternative common node values are different than the updated target node values. In another aspect, a target level node of a hierarchy includes a most accurate data of all nodes within the hierarchy. In another aspect, applying a linking constraint to common level nodes forces common level node values associated with the common level nodes to be the same value. In another aspect, the computer-program product may further comprise instructions configured to cause the data processing apparatus to compute disaggregation factors for each of the nodes of two or more hierarchies, and determine, using the disaggregation factors for a parent node in a hierarchy, whether a set of child nodes of the parent node comply with flow conservation properties, wherein determining whether a set of child nodes of the parent node comply with flow conservation properties includes determining if a sum of the node values of the child nodes equals the node value of the parent node. In another aspect, determining that the sum of the node values of the child nodes does not equal the node value of the parent node includes comparing the difference between the sum of the node values of the child nodes and the node value of the parent node to a predetermined threshold. In another aspect, the computer-program product may further comprise instructions configured to cause the data processing apparatus to determine that the set of child nodes of the parent node comply with flow conservation properties if the difference between the sum of the node values of the child nodes and the node value of the parent node are less than the predetermined threshold.

In another embodiment, a computing device may comprise one or more processors, and a memory having instructions stored thereon, which when executed by the one or more processors. The processor may cause the computing device to perform operations including receiving data associated with nodes of two or more hierarchies, wherein nodes are associated with original node values, identifying a common level node and a target level node for each of the hierarchies, identifying a linking constraint, wherein the linking constraint includes a rule to adjust a node from a hierarchy to make it consistent with a node from another hierarchy, applying the linking constraint to the common level node of each of the hierarchies, wherein applying the linking constraint includes generating updated common node values associated with the common level nodes, and wherein updated common node values are the same node values, applying the updated common node values to the target level node of each of the hierarchies, wherein applying the updated common node values includes generating updated target node values, and generating a resolved hierarchy using the updated target node values.

In an aspect, the updated common node values have the same value as a value of one of the common level nodes before the linking constraint is applied to the common level node of each of the hierarchies. In another aspect, the computing device may further comprise instructions, which when executed by the one or more processors, cause the computing device to perform operations including computing a change in target node value associated with each of the two or more hierarchies, determine that the change in target node value associated with one or more of the hierarchies are above a predetermined threshold, and re-apply the linking constraint to the common level node of each of the hierarchies, wherein applying the linking constraint includes generating alternative common node values associated with the common level nodes, wherein the alternative common node values are the same node values, and wherein the alternative common node values are different than the updated target node values. In another aspect, a target level node of a hierarchy includes a most accurate data of all nodes within the hierarchy. In another aspect, applying a linking constraint to common level nodes forces common level node values associated with the common level nodes to be the same value. In another aspect, the computing device may further comprise instructions, which when executed by the one or more processors, cause the computing device to perform operations including computing disaggregation factors for each of the nodes of two or more hierarchies, and determine, using the disaggregation factors for a parent node in a hierarchy, whether a set of child nodes of the parent node comply with flow conservation properties, wherein determining whether a set of child nodes of the parent node comply with flow conservation properties includes determining if a sum of the node values of the child nodes equals the node value of the parent node. In another aspect, determining that the sum of the node values of the child nodes does not equal the node value of the parent node includes comparing the difference between the sum of the node values of the child nodes and the node value of the parent node to a predetermined threshold. In another aspect, the computing device may further comprise instructions, which when executed by the one or more processors, cause the computing device to perform operations including determining that the set of child nodes of the parent node comply with flow conservation properties if the difference between the sum of the node values of the child nodes and the node value of the parent node are less than the predetermined threshold.

In another embodiment, a computer-implemented method may comprise receiving data associated with nodes of two or more hierarchies, wherein nodes are associated with original node values, identifying a common level node and a target level node for each of the hierarchies, identifying a linking constraint, wherein the linking constraint includes a rule to adjust a node from a hierarchy to make it consistent with a node from another hierarchy, applying the linking constraint to the common level node of each of the hierarchies, wherein applying the linking constraint includes generating updated common node values associated with the common level nodes, and wherein updated common node values are the same node values, applying the updated common node values to the target level node of each of the hierarchies, wherein applying the updated common node values includes generating updated target node values, and generating a resolved hierarchy using the updated target node values.

In an aspect, the updated common node values have the same value as a value of one of the common level nodes before the linking constraint is applied to the common level node of each of the hierarchies. In another aspect, the method may further comprise computing a change in target node value associated with each of the two or more hierarchies, determine that the change in target node value associated with one or more of the hierarchies are above a predetermined threshold, and re-apply the linking constraint to the common level node of each of the hierarchies, wherein applying the linking constraint includes generating alternative common node values associated with the common level nodes, wherein the alternative common node values are the same node values, and wherein the alternative common node values are different than the updated target node values. In another aspect, a target level node of a hierarchy includes a most accurate data of all nodes within the hierarchy. In another aspect, applying a linking constraint to common level nodes forces common level node values associated with the common level nodes to be the same value. In another aspect, the method may further comprise computing disaggregation factors for each of the nodes of two or more hierarchies, and determine, using the disaggregation factors for a parent node in a hierarchy, whether a set of child nodes of the parent node comply with flow conservation properties, wherein determining whether a set of child nodes of the parent node comply with flow conservation properties includes determining if a sum of the node values of the child nodes equals the node value of the parent node. In another aspect, determining that the sum of the node values of the child nodes does not equal the node value of the parent node includes comparing the difference between the sum of the node values of the child nodes and the node value of the parent node to a predetermined threshold. In another aspect, the method may further comprise determining that the set of child nodes of the parent node comply with flow conservation properties if the difference between the sum of the node values of the child nodes and the node value of the parent node are less than the predetermined threshold.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION

Figure 1:
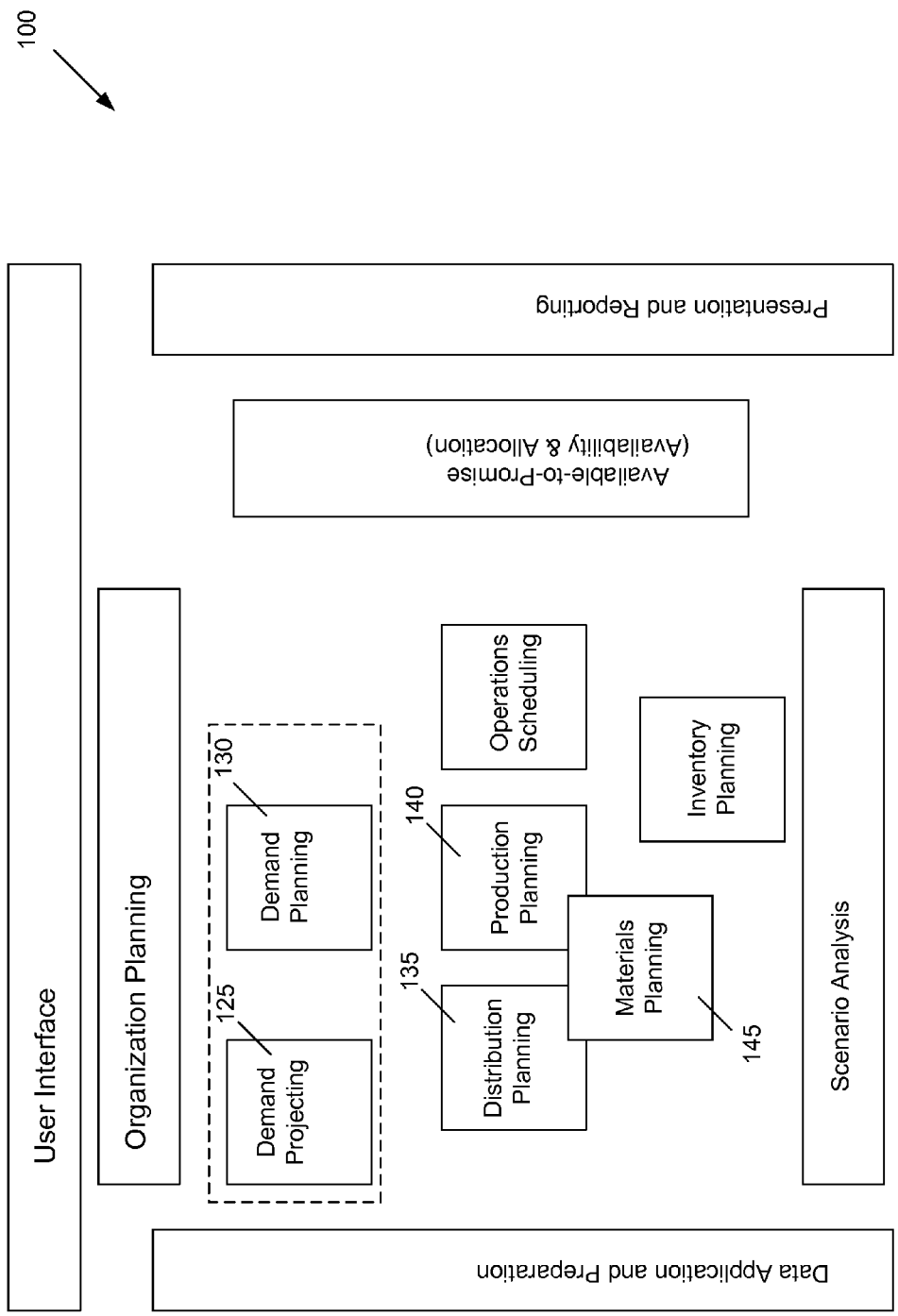
FIG. 1 illustrates a block diagram including a system for an organization, according to embodiments of the present technology.

In the following description, for the purposes of explanation, specific details are set forth in order to provide a thorough understanding of embodiments of the technology. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the example embodiments will provide those skilled in the art with an enabling description for implementing an example embodiment. It should be understood that various changes may be made in the function and arrangement of elements without departing from the spirit and scope of the technology as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

The present disclosure relates to resolving over multiple hierarchies. Specifically, various techniques and systems are provided for adjusting multiple hierarchies for consistency within levels of the hierarchies using an optimization-based approach that results in a more accurate projection across dimensions and levels in hierarchies. Hierarchies can be represented as rooted trees and include levels representing different aggregations of the time series, for example, statistical characteristics, seasonal clusters, or a business dimension for which the demand and supply planning is taking place. Each level may contain one or more nodes, which represent a time series. For example, one hierarchy may be focused on one or more products (e.g., as created by a product manager in a product division of the organization) and another hierarchy may be focused on distribution of the one or more products (e.g., as created by a distribution manager in a distribution division of the organization). A hierarchy may include only a few nodes, may exceed millions, or somewhere in between.

Furthermore, different hierarchies within an organization may represent, and be created by, different parts of the organization. In other words, different parts of an organization may map their planning needs in different hierarchies or planning structure, and therefore using different criteria and focuses. For example, one hierarchy may be focused on one or more products (e.g. as created by a product manager in a product division of the organization) and another hierarchy may be focused on distribution of the one or more products (e.g. as created by a distribution manager in a distribution division of the organization).

Each hierarchy may include multiple aggregation levels. Each level may include a different portion of a projection segment or planning chain related to the part of the organization that the hierarchy is focused on. For example, a product dimension hierarchy may include levels focused on the brand of the product, the type of the product, the packaging of the product, the distribution of the product, and the SKU of the product, among others. Different parts or sub-parts of the organization may also focus on one or more certain levels within a planning hierarchy. Therefore, since the planning hierarchies may focus on separate, disjointed parts of the organization, an organization may be unable to view a single hierarchy or plan that focuses on all aspects of the organization.

Embodiments of the present technology include systems and methods for resolving multiple hierarchies. The hierarchies (e.g., two or more hierarchies) may be adjusted using common or overlapping levels within each of the hierarchies. For example, even though multiple hierarchies may be focused on different aspects of the time series statistical properties, or an organization, the hierarchies may overlap or share levels. The hierarchies may converge or overlap at a common or a common level (e.g. SKU-store level), or "leaf" level. Embodiments of the present technology may adjust the respective common levels of the multiple hierarchies to make them consistent or equal, which may affect the other levels of the hierarchies (e.g. a target level). The hierarchies may be adjusted or resolved so as to minimize the impact of the reconciliation on certain levels of the hierarchies, which may already be, for example, important, accurate, or effective. Such embodiments of the present technology are described herein with respect to FIGS. 1-11.

FIG. 1 illustrates a block diagram including a planning system for an organization, according to embodiments of the present technology. Planning system 100 includes various blocks representing different aspects of the planning system of an organization. Planning system 100 includes various blocks, each of which represent a different aspect or portion (e.g. a department) of an organization's projection model. For example, planning system 100 includes demand projecting block 125, demand planning block 130, distribution planning block 135, production planning block 140, and materials planning block 145, among others. Although some of the different portions of an organization may overlap, others may be relatively disjointed within the organization. Furthermore, as noted, each portion of the organization may produce or generate a projection plan or hierarchy by itself without consulting with or being consistent with the other portions or departments of the organization. Embodiments of the present technology may allow an organization to resolve or merge such disjointed hierarchies.

Embodiments of the present technology may be described herein with respect to demand projecting 125 and demand planning 130. However, embodiments of the present technology may also be applied to various other aspects of an organization, including other aspects represented, for example, elsewhere in planning system 100.

Figure 2:
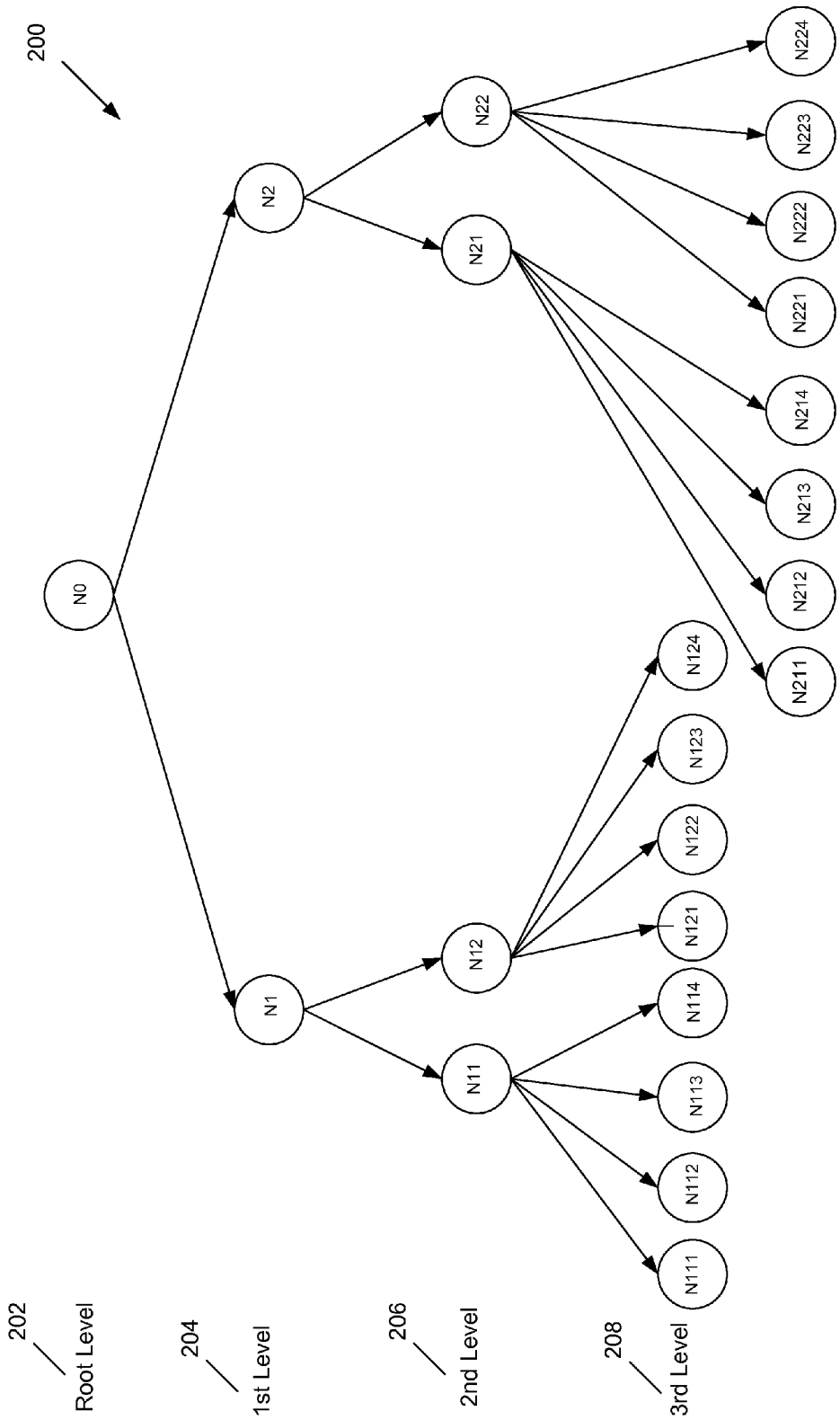
FIG. 2 illustrates an example section of a hierarchy, according to embodiments of the present technology.

FIG. 2 illustrates an example section 200 of a hierarchy, according to embodiments of the present technology. Hierarchy 200 includes four different levels: root (or zero) level 202, 1st level 204, 2nd level 206, and 3rd level 208. Even though hierarchy 200 includes four levels, hierarchy 200 may be include fewer (e.g., 1, 2 or 3) levels or more (e.g., 5, 6, 7, etc.) levels according to embodiments of the present technology. Each level of a hierarchy may represent a step or portion of the projection represented by the hierarchy. For example, a product-focused department of a retail organization may generate a projection hierarchy that includes levels (e.g., categories) of the brand of each product, the package type of each product, the SKU of each product, the distributor that will distribute the product, and the store that will carry the product. Each of those levels may be represented in a hierarchy, such as hierarchy 200, as a different level. For example, root level 202 may represent a set of products (e.g., all products of that organization), 1st level 204 may represent product line, 2nd level 206 may represent the SKU of each product, and 3rd level 208 may represent the store that will carry the product.

Each level within hierarchy 200 includes one or more nodes, i.e. time series. For example, root level 202 includes just one node, 1st level 204 includes two nodes, 2nd level 206 includes four nodes, and 3rd level 208 includes sixteen nodes. Each node within a level may represent a specific item within the category that the level represents. For example, if 1st level 204 of hierarchy 200 represents the product line of the product, each node within 1st level 204 may represent a different product line that is possible for the product in question. As used herein, the terms "parent" node and "child" node or "children" nodes are used to describe the relationship between nodes that are connected between different levels, where the "parent" node is the node that is one level higher in the hierarchy than the "child" node or "children" nodes. For example, if root level 202 represents different products within the hierarchy, and node N0 represents a dish washer product, then the nodes from 1st level 204 (i.e. the "child" or "children" nodes) that connect to node N0 (i.e. the "parent" node N0 (i.e. the "parent" node) may represent the different types of design that exist for the dish washer product. More specifically, nodes N1 and N2 may represent different types of dish washers, such as color, functionality and capacity, respectively. In another example, if 1st level 204 represents different types of packaging within the hierarchy, and node N0 represents a product that is packaged in a glass bottle, then the nodes from 2nd level 206 (i.e. the "child" or "children" nodes) that connect to node N0 (i.e. the "parent" node) may represent the different sku's that may be bottled using a glass bottle.

Each node within each level may include a value that the node represents at a specific point in time. For example, if a level represents different types of packaging for a company's products, then each node within the level may include a value that is or represents the demand of the different types of packaging, at a specific point in time. More specifically, each level may include either a type of packaging (e.g. glass bottle, plastic bottle, can, etc.) or may include a numerical or other value (e.g. 1, 2, 3, etc.) that represents a type of packaging. Such values may exist within each node of each level no matter what each level represents within the hierarchy and the organization.

Since node N0 may represent one type of product within a larger hierarchy produced by, for example, a certain department of an organization, one or more other nodes on root level 202 may exist, and each may represent a different type of product. Furthermore, hierarchy 200 may only be one hierarchy of the two or more hierarchies generated by the organization or by statistical reasoning. For example, each department or combinations of departments (or portions of departments) may generate their own hierarchy (e.g. projection or forecasting hierarchy) that may look similar to hierarchy 200 or a combination of portions of hierarchies that are similar to hierarchy 200. Each of the hierarchies generated within an organization may overlap or share common levels or portions of levels, but may generally be dissimilar in other respects. Therefore, the hierarchies may be resolved or adjusted to facilitate generating a single time series at some common level that includes information from individual hierarchies. As used herein (both with respect to FIG. 2 and later figures), the terms projection or projecting may describe a prediction or predicting, a plan or planning, an estimate or estimating, a prediction or predicting, a prognostication or prognosticating, a forecast or forecasting, among others.

Figure 3:
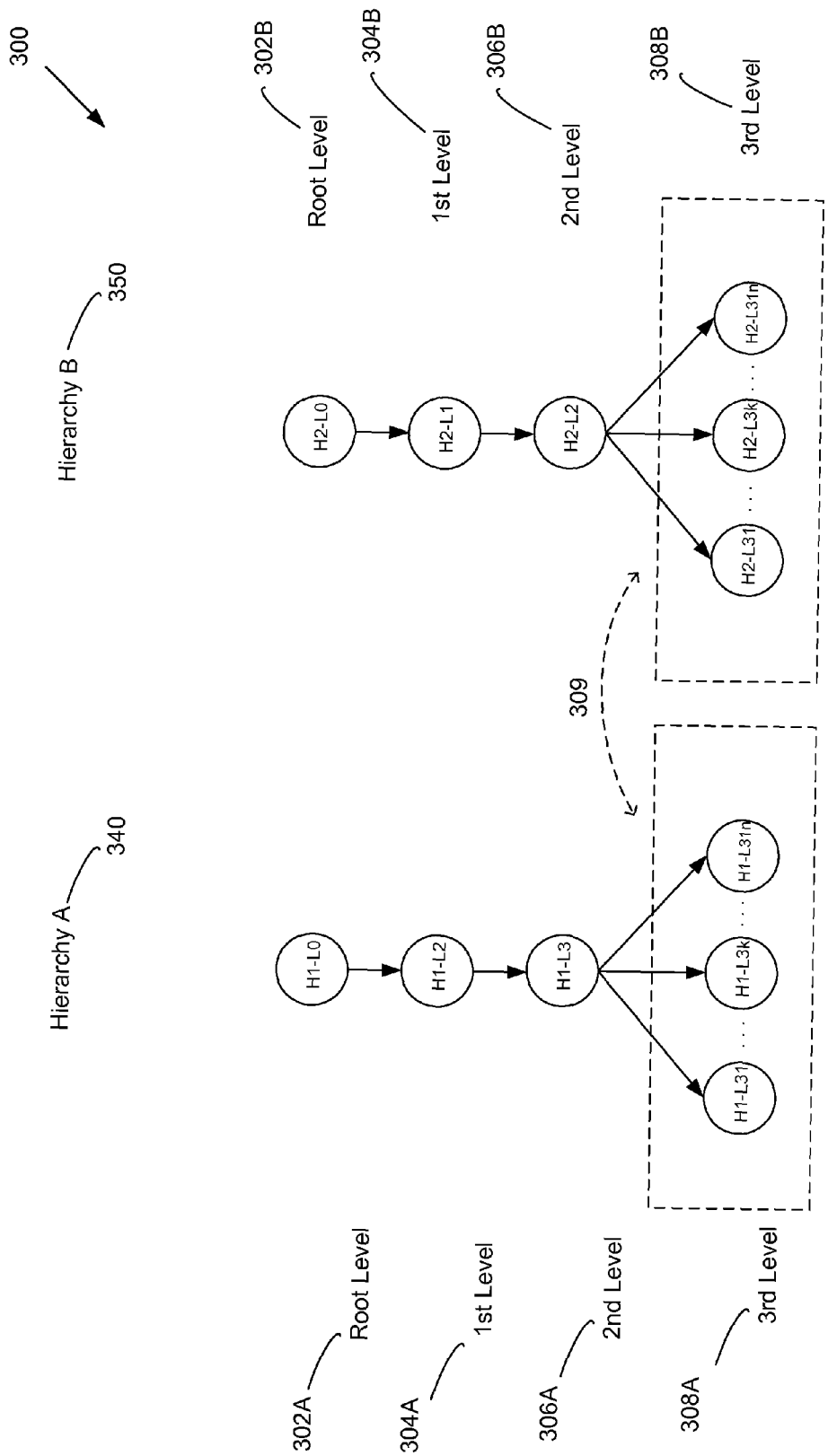
FIG. 3 includes an example of two hierarchies, according to embodiments of the present technology.

FIG. 3 includes an example of two hierarchies 300, according to embodiments of the present technology. More specifically, the combination of hierarchies 300 includes two hierarchies, Hierarchy A 340 and Hierarchy B 350. Hierarchy A 340 includes four levels, root level 302A, $1^{st}$ level 304A, $2^{nd}$ level 306A, and $3^{rd}$ level 308A. Hierarchy B 350 includes four levels, root level 302B, $1^{st}$ level 304B, $2^{nd}$ level 306B, and $3^{rd}$ level 308B.

As noted, the two hierarchies may represent different portions, departments of an organization or a pure statistical hierarchy, and may reflect the future goals or focuses of their respective departments or statistical buckets. To adjust the two independent hierarchies into a single hierarchy (or to adjust both hierarchies to make them consistent), the hierarchies may include one or more levels and nodes within levels to be made consistent. In other words, the system may recognize that a certain level of each of the hierarchies represent a similar aspect or phase of the organization. Even though the hierarchies may have been generated from, for example, two different departments of the organization and may be generally focused on their respective departments, the hierarchies may overlap at a certain level. For example, if hierarchy A represents a projection for a product-focused department and hierarchy B represents a projection for a location-focused department, both hierarchies may include levels focused on, for example, the type of products being sold by the organization or sku-store.

Once a common level has been identified, the nodes (or, more specifically, the node values behind the nodes) may be used in process to adjust the two hierarchies. To resolve (or, for example, to reconcile) the two hierarchies, a set of linking constraints may be applied to the two hierarchies. A linking constraint is a rule that limits how node values within the hierarchies may be changed. As shown in FIG. 3, to resolve hierarchies A and B with each other to yield a set of consistent, similar or matching hierarchies, the common level 309 operates as the linking level. As used herein (both with respect to FIGS. 2 and 3 and later figures), the terms/phrases resolving or making consistent may describe merging, reconciling, making match within a threshold degree of similarity, among others.

Figure 4:
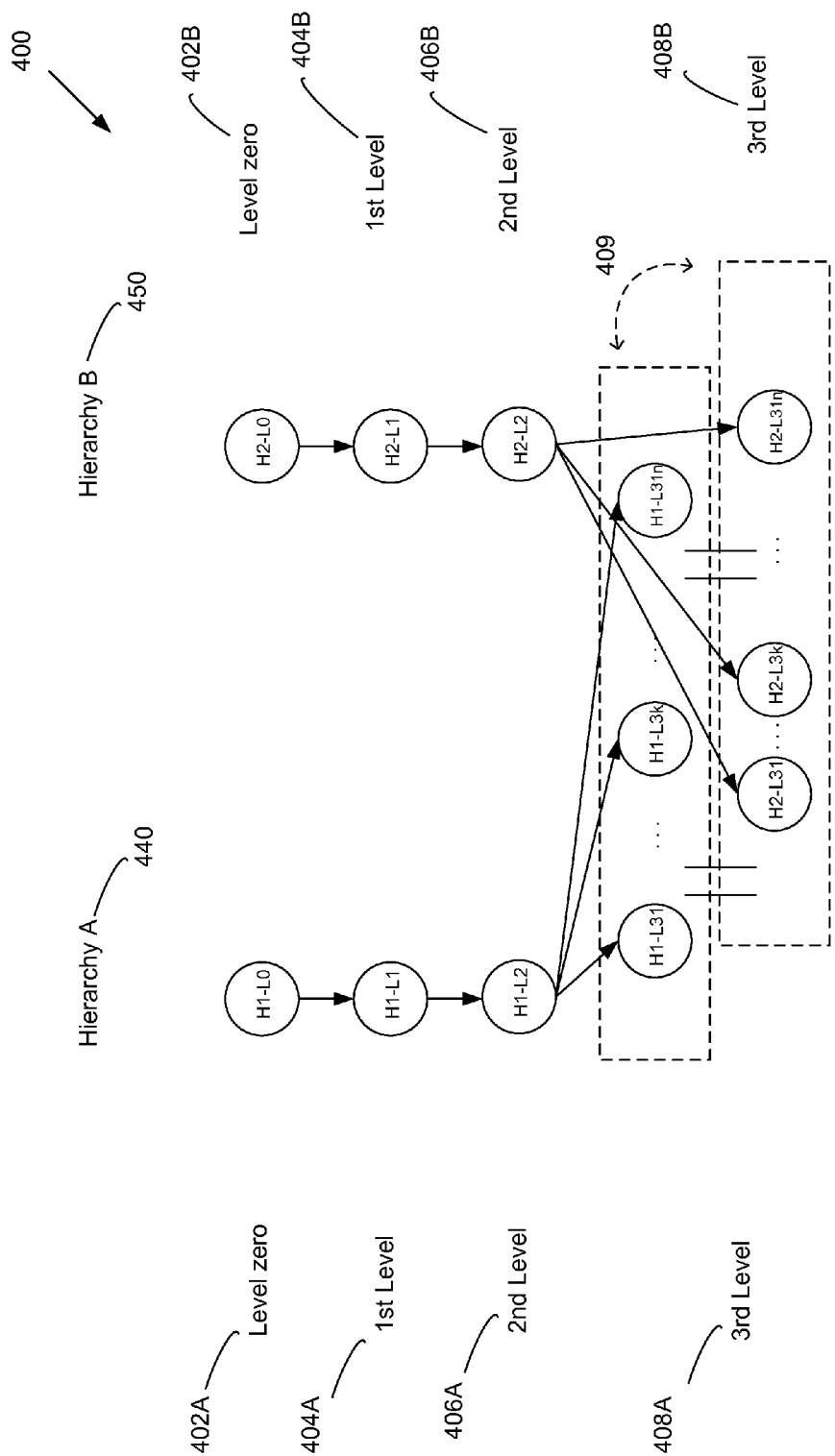
FIG. 4 includes a combination of hierarchies, according to embodiments of the present technology.

FIG. 4 includes a combination of hierarchies 400, according to embodiments of the present technology. Hierarchy A 440 includes four levels, root level 402A, $1^{st}$ level 404A, $2^{nd}$ level 406A, and $3^{rd}$ level 408A. Hierarchy B 450 includes four levels, root level 402B, $1^{st}$ level 404B, $2^{nd}$ level 406B, and $3^{rd}$ level 408B.

The combination of hierarchies 400 is similar to the combination of hierarchies 300 in FIG. 3 and includes the same example nodes. As shown in FIG. 4, to resolve hierarchies A and B with each other to yield a set of consistent hierarchies, the common level 409 may be identified as the linking level where reconciliation is initiated. In other words, individual common level 408A (3th level of Hierarchy A 440) and 408B ($3^{rd}$ level of hierarchy B 450) may be resolved, reconciled or otherwise made consistent with each other. More specifically, the node values of levels 408A and 408B may be adjusted so that their node values are equal. This rule that the node values for the hierarchy A common level and the hierarchy B common level may be an example of a linking constraint. As shown in FIG. 4, levels 408A and 408B include the same number of nodes and node values. Therefore, the values of the corresponding nodes between the two levels (one from each hierarchy) may be made to be the same value. For example, the node value for node H1-L3$k$ may be made the same as the node value for node H2-L3$k$. This process may be repeated for each of the node values within the levels 409 so that each of the node values for the nodes within the levels are equal. In other words, this process may cause the values within levels 408A and 408B to be the same.

In causing the node values for the nodes in the common levels to be equal, the node values for the common level from one of the hierarchies (i.e. the node values for level 408A or for level 408B) may be changed to include the same values as the node values for the corresponding common level from the other hierarchy. In other words, the node values for level 408A may be changed so that they are equal to the node values for level 408B, or the node values for level 408B may be changed so that they are equal to the node values for level 408A. Alternatively, all of the node values in the common level (i.e. the node values for both level 408A and 408B) may be changed to be equal to a set of values different than the node values of level 408A or 408B.

Figure 5:
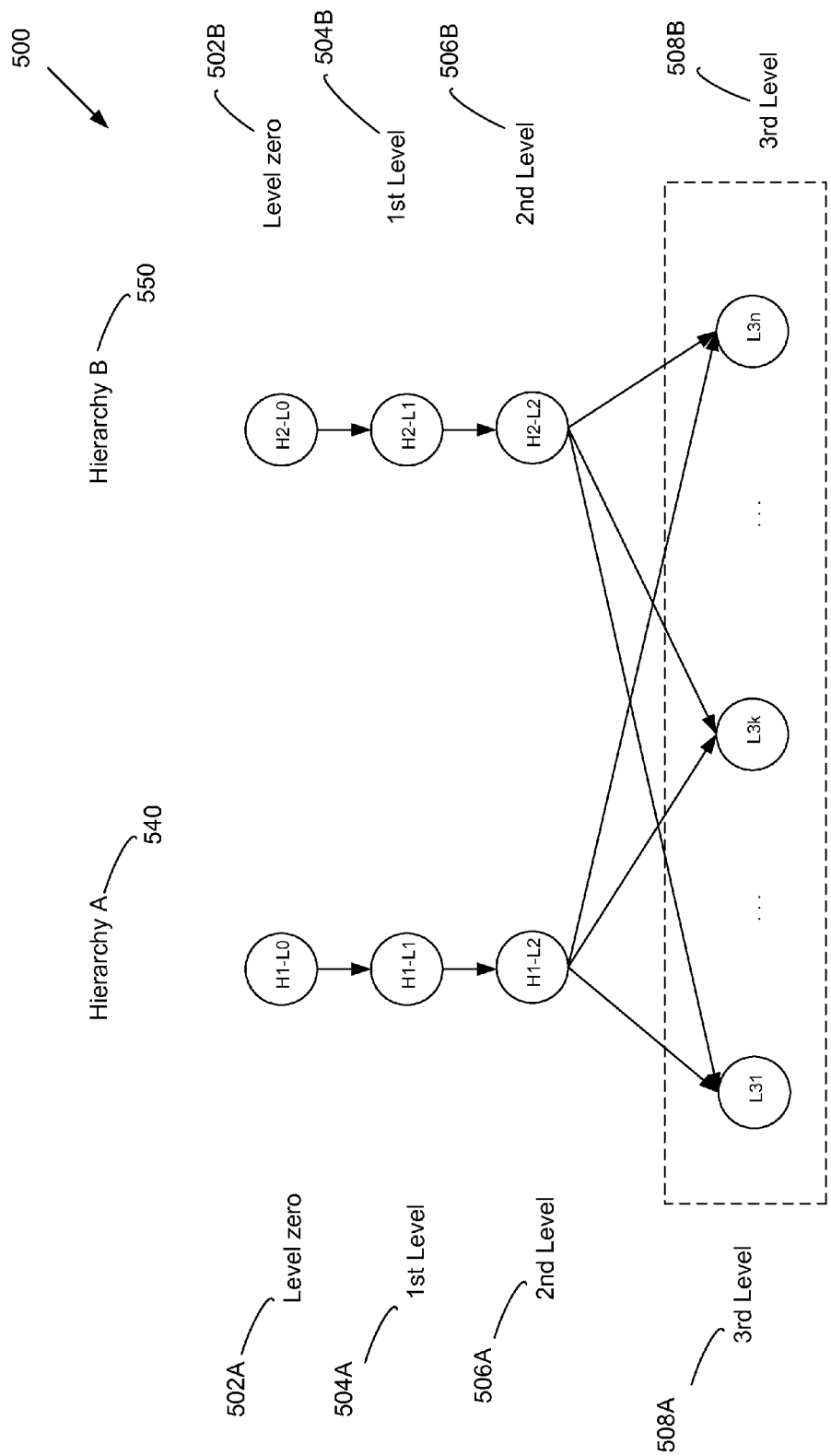
FIG. 5 includes two hierarchies, according to embodiments of the present technology.

FIG. 5 includes two hierarchies 500, according to embodiments of the present technology. Hierarchy A 540 includes four levels, root level 502A, $1^{st}$ level 504A, $2^{nd}$ level 506A, and $3^{rd}$ level 508A. Hierarchy B 550 includes four levels, root level 502B, $1^{st}$ level 504B, $2^{nd}$ level 506B, and $3^{rd}$ level 508B.

The two hierarchies 500 include a common level of nodes, L31 through L3$n$. More specifically, nodes L31 through L31 include the combined level node values of levels 409 after the respective node values within the two hierarchies being resolved (i.e. reconciled) were brought into alignment with each other, as described above with respect to FIG. 4.

Any time the node values for nodes within a level of a hierarchy are changed, the node values for nodes within other levels of the hierarchy may also be adjusted automatically. For example, if a common level of a hierarchy is a sku-store level of a retail business hierarchy, and numbers of each sku at the various stores of the retail company are adjusted, then the numbers for each of the different types of packaging that apply to the different sku's may also change. In other words, when a child node changes value, the values of one or more of the parent nodes of the child node may also change. Any or all of the levels within each of the hierarchies being resolved may be affected by the equalization of the common levels.

One or more of the levels within each of the hierarchies being made consistent and aligned may be recognized by the system as important, realistic, or accurate. For example, the node values within a certain level of a hierarchy may be identified by the system as having a high level of accuracy in projecting or forecasting future needs for the organization. In other words, while a set of lower level child nodes of a hierarchy may be relatively inaccurate due to the volatile and common nature of that level, higher level parent nodes may be more accurate. More specifically, for example, while the sku-store level of a hierarchy for a retail-based business may be relatively inaccurate due to the volatile and common nature of that level, one or more other levels within the hierarchy, such as the product type or packaging type levels, may be more accurate. Such an accurate or realistic level may be identified as a "target" level. An example set of target levels within hierarchies 400 may be target levels 404A. Since a target level may be considered to be the most accurate portion of a hierarchy, the system may choose to avoid changing the node values of the target level as much as possible. In other words, even though node values within other levels within the hierarchies being made consistent, reconciled or aligned may be changed during reconciliation and alignment, the system may choose to perform the process so as to affect the target level node values as little as possible, or to minimize the impact on the target level.

As noted, when the common level from the two or more hierarchies are brought into alignment by relating and transforming their node values, the resulting node values of the common level may be changed to include a variety of different values. More specifically, the node values for the resulting common level may be the same as the node values for one of the two pre-aligned common levels, or the node values for the resulting level may include a set of new node values, or a combination of both. Also as noted, when the common level of the hierarchies are aligned, other levels of the hierarchies (including a target level) may also be impacted. When a target level is identified, and the common level is adjusted for consistency, the aligned node values for the common level may be chosen so that impact on the target level node values is minimized. In other words, the node values that the common level of hierarchies A and B may be changed to be a set of values that, when compared to any other set of numbers, minimizes the amount that the target level node values are changed.

In an embodiment, the multiple hierarchies may be adjusted or resolved for consistency by minimizing the squared distance between current target values and updated values, and minimizing the squared distance between current disaggregation factors and updated disaggregation factors, and finally adding a set of linking constraints. This can be expressed in the following optimization model:

$$\min_{\alpha,\theta} \sum_{i=1}^{M} \left( \sum_{j=1}^{M_i} w_{ij} \times \left( \hat{X}_{ij} - \sum_{k=1}^{N} \sum_{l=1}^{M} \alpha_{lk} \times \hat{y}_{lk} \right)^2 + \sum_{k=1}^{N} (\hat{\gamma}_{ik} - \theta_{ik})^2 \right)$$

where M is the number of hierarchies, $M_i$ is the number of target nodes in hierarchy i, $w_{ij}$ is the weight given to target node j in hierarchy i, $\hat{X}_{ij}$ is the projected or forecasted value in target node j in hierarchy i, N is the number of common level nodes (which, for example, is the same for all hierarchies), $\alpha_{lk}$ is the weight given to common level node k in hierarchy l, $\hat{y}_{kl}$ is the value in common node k in hierarchy l, and $\hat{\gamma}_{ik}$ is the disaggregation factor in common node k in hierarchy i. The first term of this equation minimizes the squared distance between initial target level node value and its updated value, and the second term of the equation minimizes the squared distance between the initial disaggregation factor and its updated value.

For a some hierarchies, it may be necessary to aggregate a set of child nodes to get to a common node level. In such a case, $\hat{y}_{lk}$ may be replaced by a sum of the child nodes, $\hat{y}_{lk}$ being the parent node.

$$\alpha_{lk} \geq 0, \theta_{lk} \geq 0, \forall k, l$$

$$\sum_{l=1}^{M} \alpha_{lk} = b, \forall k, b > 0$$

$$\sum_{l=1}^{M} \alpha_{lk} \times \hat{y}_{lk} - \theta_{lk} \times \sum_{i=1}^{N} \sum_{j=1}^{M} \alpha_{ji} \times \hat{y}_{ji} = 0 \forall k, l$$

Figure 6:
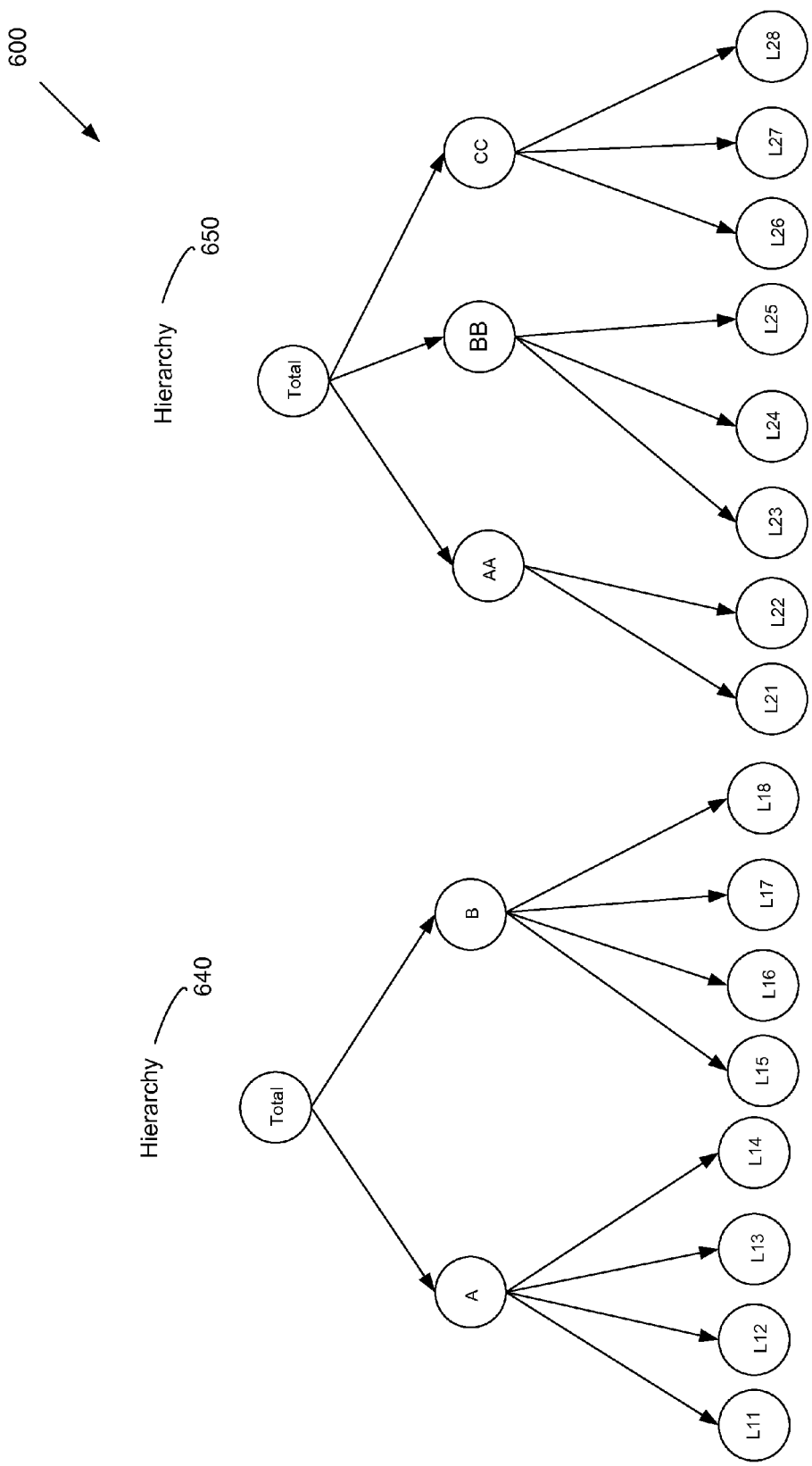
FIG. 6 illustrates an example set of hierarchies that can be used to determine how the impact on the target level node values may be minimized, according to embodiments of the present technology.

FIG. 6 illustrates an example set of hierarchies 600 that can be used to determine how the impact on the target level node values may be minimized, according to embodiments of the present technology. Hierarchies 600 include hierarchy 640 and hierarchy 650. As noted, one or more of the levels within each of the hierarchies being aligned may be recognized by the system as important, realistic, or accurate, and that level may be called the target level. For example, the second level (nodes A and B in hierarchy 640 and nodes AA, BB, and CC in hierarchy 650) may be the target level. Furthermore, each of the hierarchies may overlap or share common levels or portions of levels, called the common level. The common levels may be reconciled to facilitate generating a single time series at some common level that includes information from individual hierarchies. In hierarchies 600, the third level (nodes L11-L18 in hierarchy 640 and nodes L21-L28 in hierarchy 650) may be the common levels.

For an example as shown in FIG. 6, the following equation may determine how the impact on the target level node values may be minimized (we have M=2, $M_1$=2, $M_2$=3, N=8, and we set the weights w=1).

$$\min_{\alpha,\theta} \left( A - \sum_{i=1}^{4} (\alpha_{1i} \times L_{1i} + \alpha_{2i} \times L_{2i}) \right)^2 + \left( B - \sum_{i=5}^{8} (\alpha_{1i} \times L_{1i} + \alpha_{2i} \times L_{2i}) \right)^2 +$$

$$\left( AA - \sum_{i=1}^{2} (\alpha_{1i} \times L_{1i} + \alpha_{2i} \times L_{2i}) \right)^2 + \left( BB - \sum_{i=3}^{5} (\alpha_{1i} \times L_{1i} + \alpha_{2i} \times L_{2i}) \right)^2 +$$

$$\left( CC - \sum_{i=6}^{8} (\alpha_{1i} \times L_{1i} + \alpha_{2i} \times L_{2i}) \right)^2 + \sum_{k=1}^{8} (\hat{y}_{1k} - \theta_{1k})^2 + \sum_{k=1}^{8} (\hat{y}_{2k} - \theta_{2k})^2$$

subject too
$\alpha_{11}+\alpha_{21}=1$, $\alpha_{12}+\alpha_{22}=1$, $\alpha_{13}+\alpha_{23}=1$, $\alpha_{14}+\alpha_{24}=1$, $\alpha_{15}+\alpha_{25}=1$, $\alpha_{15}+\alpha_{25}=1$, $\alpha_{16}+\alpha_{26}=1$, $\alpha_{17}+\alpha_{27}=1$, $\alpha_{18}+\alpha_{28}=1$, $$\sum_{l=1}^{2} \alpha_{l1} \times L_{l1} - \theta_{11} \times \sum_{i=1}^{4} \sum_{j=1}^{2} \alpha_{ji} \times L_{ji} = 0, \ldots$$

$$\sum_{l=1}^{2} \alpha_{l4} \times L_{l4} - \theta_{14} \times \sum_{i=1}^{4} \sum_{j=1}^{2} \alpha_{ji} \times L_{ji} = 0,$$

$$\sum_{l=1}^{2} \alpha_{l5} \times L_{l5} - \theta_{15} \times \sum_{i=5}^{8} \sum_{j=1}^{2} \alpha_{ji} \times L_{ji} = 0, \ldots$$

$$\sum_{l=1}^{2} \alpha_{l8} \times L_{l8} - \theta_{18} \times \sum_{i=1}^{8} \sum_{j=1}^{2} \alpha_{ji} \times L_{ji} = 0,$$

$$\sum_{l=1}^{2} \alpha_{l1} \times L_{l1} - \theta_{21} \times \sum_{i=1}^{2} \sum_{j=1}^{2} \alpha_{ji} \times L_{ji} = 0,$$

$$\sum_{l=1}^{2} \alpha_{l2} \times L_{l2} - \theta_{22} \times \sum_{i=1}^{2} \sum_{j=1}^{2} \alpha_{ji} \times L_{ji} = 0,$$

$$\sum_{l=1}^{2} \alpha_{l3} \times L_{l3} - \theta_{23} \times \sum_{i=3}^{5} \sum_{j=1}^{2} \alpha_{ji} \times L_{ji} = 0, \ldots$$

$$\sum_{l=1}^{2} \alpha_{l5} \times L_{l5} - \theta_{25} \times \sum_{i=3}^{5} \sum_{j=1}^{2} \alpha_{ji} \times L_{ji} = 0,$$

$$\sum_{l=1}^{2} \alpha_{l6} \times L_{l6} - \theta_{26} \times \sum_{i=6}^{8} \sum_{j=1}^{2} \alpha_{ji} \times L_{ji} = 0, \ldots$$

$$\sum_{l=1}^{2} \alpha_{l8} \times L_{l8} - \theta_{28} \times \sum_{i=6}^{8} \sum_{j=1}^{2} \alpha_{ji} \times L_{ji} = 0,$$

Figure 7:
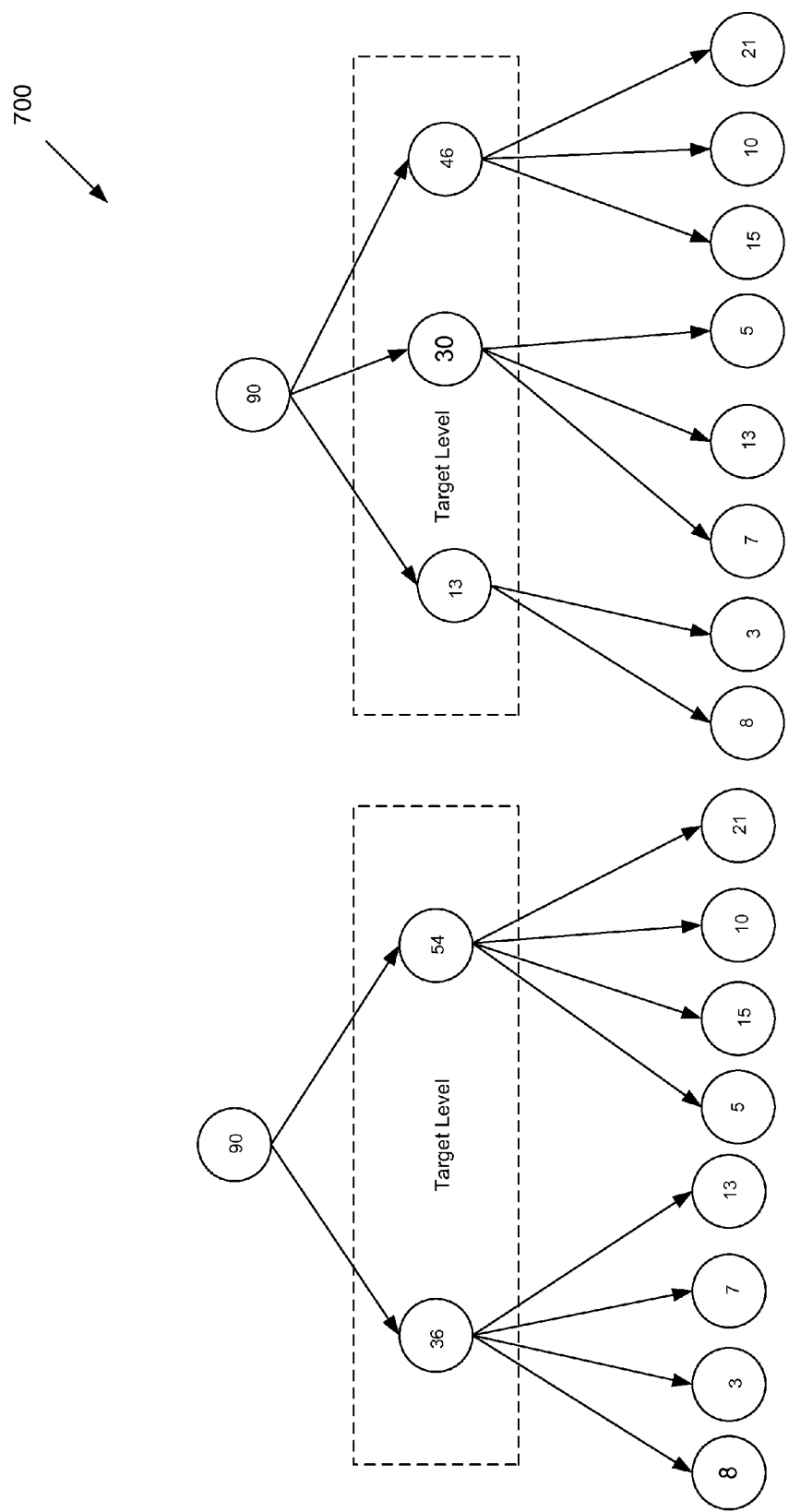
FIG. 7 illustrates an example set of hierarchies that can be used to determine how the impact on the target level node values may be minimized, according to embodiments of the present technology.
Figure 8:
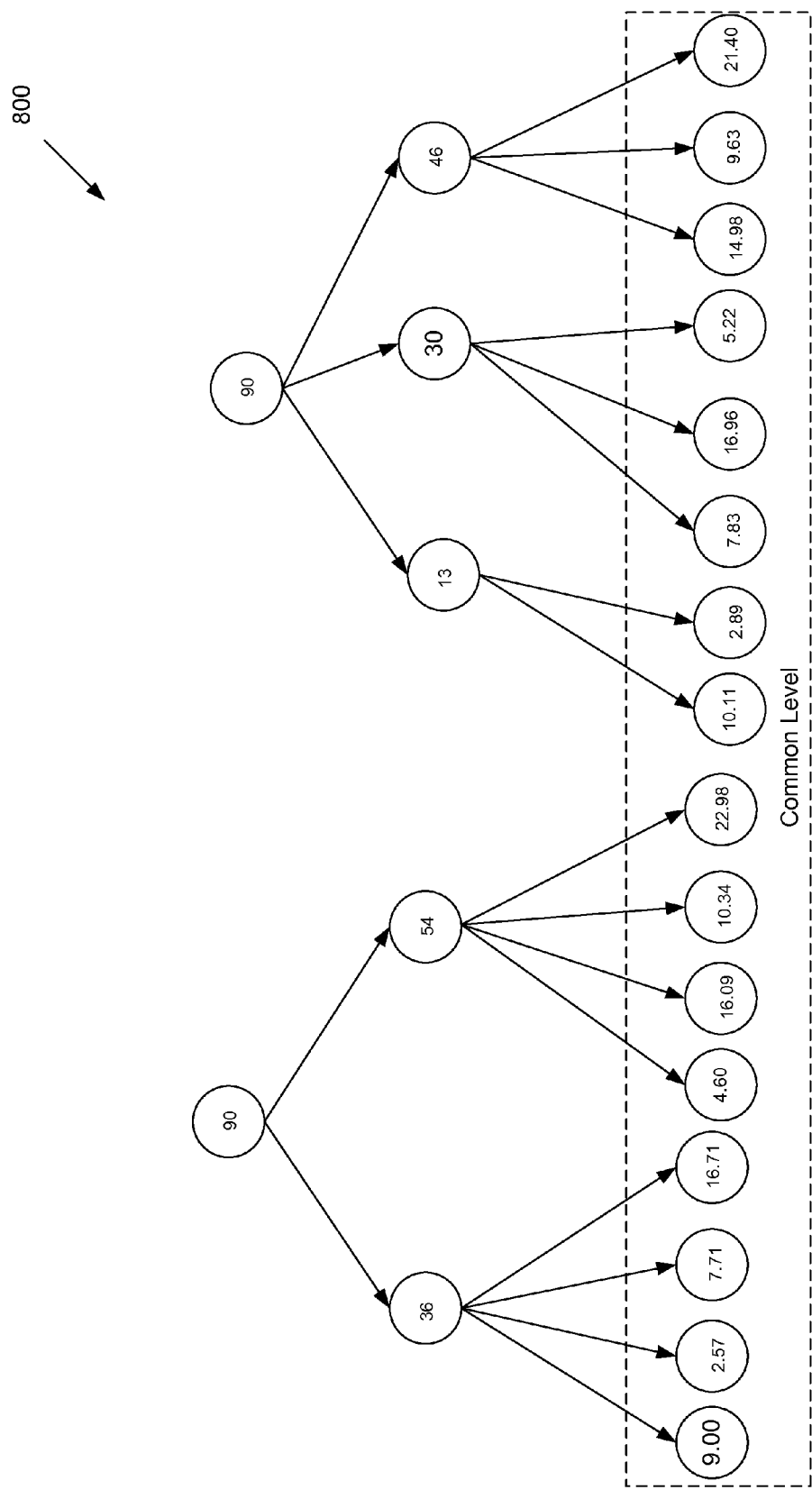
FIG. 8 illustrates an example set of hierarchies that can be used to determine how the impact on the target level node values may be minimized, according to embodiments of the present technology.
Figure 9:
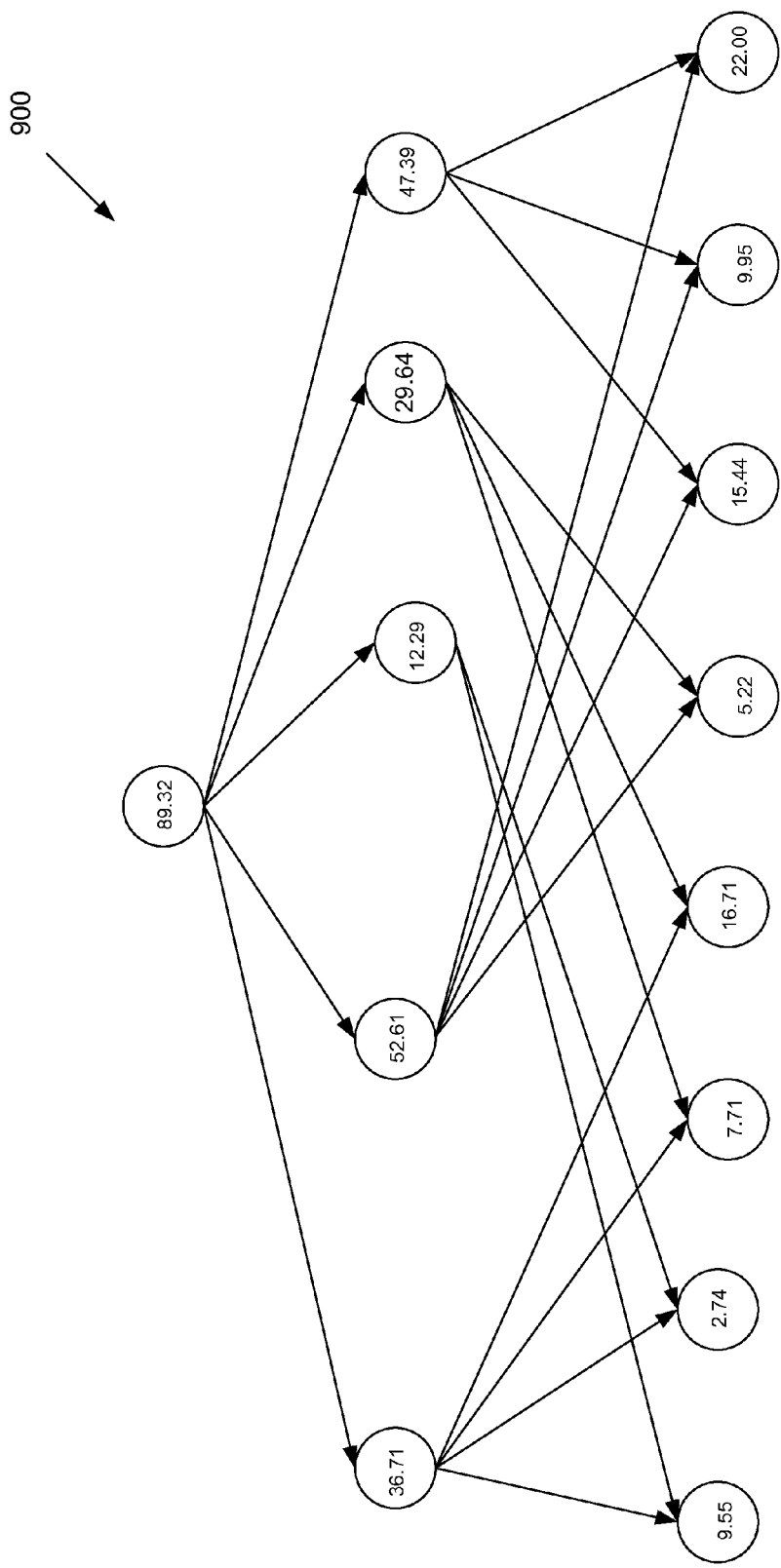
FIG. 9 illustrates an example resolved hierarchy, according to embodiments of the present technology.

FIGS. 7-9 illustrate a numerical example to determine how the impact on the target level node values may be minimized, according to embodiments of the present technology. Similar to as described with respect to FIG. 6, the second level may be assigned as the target level as shown in FIG. 7, and the third level may be assigned as the common level, as shown in FIG. 8. The target level may be chosen, for example, because that level is identified as having a high level of accuracy as compared to other levels within the hierarchies. As shown in FIG. 7, the third level nodes within the two hierarchies to be reconciled have corresponding nodes in the same level of the other hierarchy with the same value. This makes sense since those nodes are at the common level.

As shown in FIG. 8, the lower (third) common level may be aligned, or in other words the values of the nodes changed to be aligned. This procedure will also define a set of disaggregation factors, for later use in the multiple reconciliation model.

Then, the multiple hierarchies may be adjusted over the common level by minimizing the squared distance between current target values and updated values, and minimizing the squared distance between current disaggregation factors and updated disaggregation factors, and finally add a set of linking constraints. The common levels are equal, as shown in FIG. 9.

In another example embodiment of the present technology, consider the situation where one hierarchy generates an hourly projection and another hierarchy generates weekly projection. In that situation, the hierarchies are different, and they are also generating projections at two different frequencies. This difference in frequency may be handled by adding a weekly level common level and, a weekly target level in the hourly projection hierarchy. In other words, we aggregate the hourly projections to a week level. The disaggregation factors going from week to hours are then included in the optimization model through constrains. In a different scenario with different frequencies does not change the problem, and can be solved in the same way.

Figure 10:
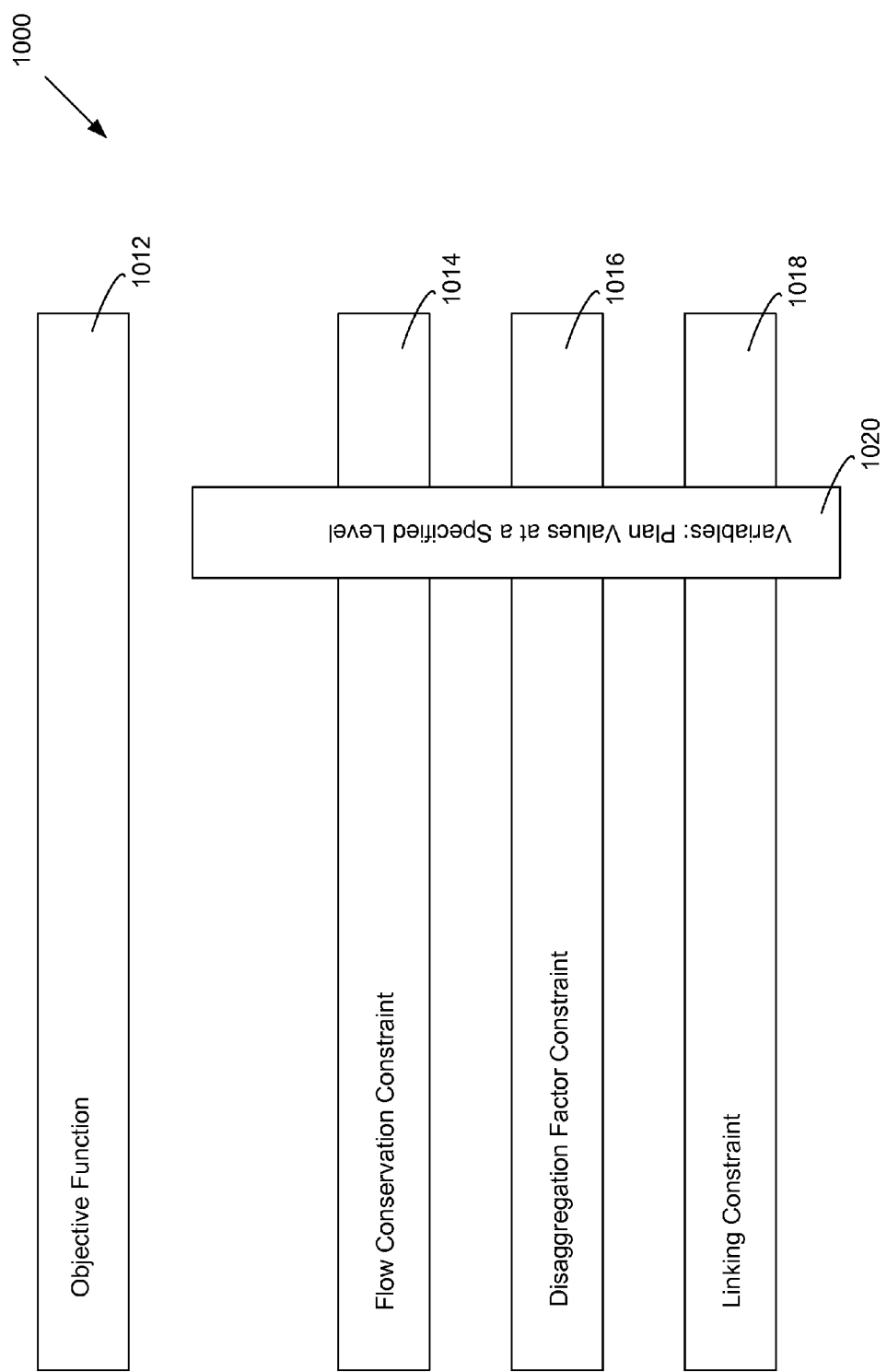
FIG. 10 illustrates a block diagram showing the logical structure of a hierarchy, according to embodiments of the present technology.

FIG. 10 illustrates a block diagram 1000 showing the logical structure of a planning hierarchy, according to embodiments of the present technology. Block diagram 1000 includes a block 1012 that represents the objective function being applied to the planning hierarchies. For example, the objective function may include applying Equation 1 to the node values within the levels of the hierarchies, which may be represented by block 1020 (the node values, or variables, at specified levels within the hierarchies). Block diagram 1000 also includes block 1018, which represents the linking constraint or constraints being applied to the hierarchies. As noted, a linking constraint may be applied to a level of the hierarchies, such as the operational levels of the hierarchies. An example linking constraint, or rule, may include making the node values from within an operational level of two or more hierarchies equal, as described herein with respect to FIGS. 8-9.

However, other constraints may be applied in the process of resolving multiple hierarchies according to embodiments of the present technology. More specifically, constraints may be applied to the hierarchies to maintain logical consistency of the planning hierarchies at all times. Block diagram 1000 includes a block 1014, which represents one or a group of flow conservation constraints. Flow conservation constraints may enforce conservation of flow within a hierarchy. For example, flow conservation constraints may enforce the rule that the node value of a parent node should equal the sum of the values of the children nodes that flow to that parent node. Applying such a rule throughout a hierarchy may help to maintain logical consistency throughout the hierarchy.

Although flow conservation constraints may enforce the rule that the node value of a parent node should equal the sum of the values of the children nodes that flow to that parent node, the constraints may enforce this rule too strictly or literally. For example, the summing of node values may cause round off error to lead to a sum that is slightly different than the node value of the parent node. Such a difference or error may cause the system to assume an inconsistency or infeasibility within the hierarchy. However, such a difference may be compared to a predetermined or dynamic threshold to determine if the difference is large enough to cause an infeasibility. For example, if the error is small enough, a relieving and augmenting variable may cause the error to be ignored by the system, and thus causing the potential infeasibility to be ignored.

Block diagram 1000 also includes a block 1016 that represents a disaggregation factor constraint that may be applied to the hierarchies. A disaggregation factor constraint may be applied to further maintain logical consistency within a hierarchy. A disaggregation factor may enforce a rule that a child node value may be a certain factor (i.e. proportion) of its parent node, and that node value may maintain that factor over time. More specifically, a disaggregation factor constraint represents the rule that the value of a parent node equals a disaggregation factor times the value of a predecessor (or child) node.

Together, the flow conservation constraint or constraints and the disaggregation factor constraint or constraints may help maintain the logical consistency of one or more hierarchies that are according to embodiments of the present technology. Therefore, the flow conservation and disaggregation factor constraints may be applied to one or more hierarchies before and during a reconciliation process, as described herein.

The flow conservation constraint and disaggregation factor constraint may be implemented into different parts of the method described herein, according to embodiments of the present technology. An example method of according to an embodiment of the present technology may include: initializing the node values for all nodes above the operational level; load statistical projection values into the operational (i.e. leaf) level nodes; aggregate the node values from the operational level up to the other levels in the architecture (e.g. root); compute disaggregation factors for each node (e.g. percent splits); fix or adjust the projection values at a desired level in each hierarchy; solve the optimization problem with linear objective; determine and apply linking constraints to the projection values; solve the optimization problem with a quadratic objective; and analyzing artificial flows.

Figure 11:
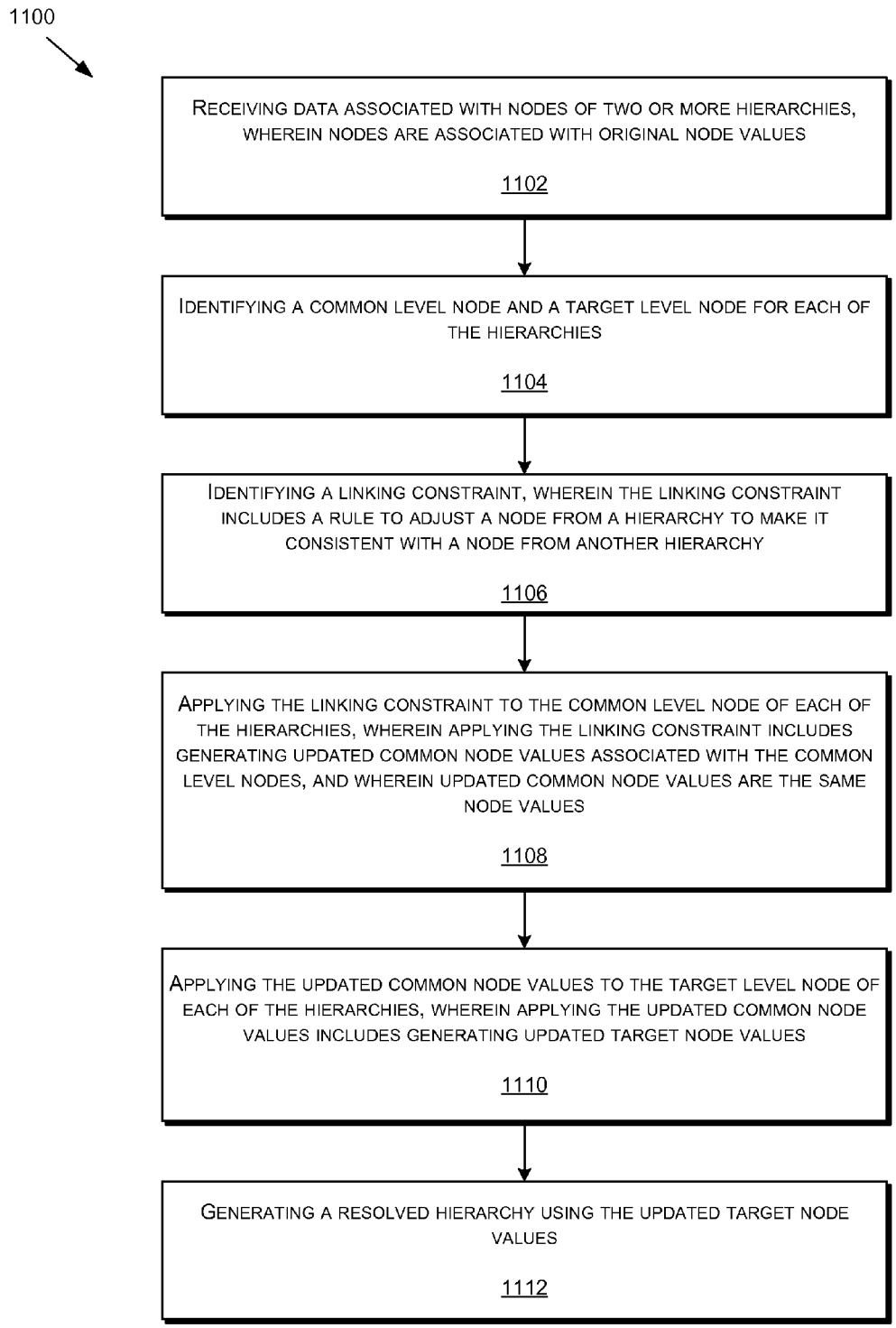
FIG. 11 is a flow chart showing an example process for resolving multiple hierarchies, according to embodiments of the present technology.

FIG. 11 is a flow chart 1100 showing an example process for resolving multiple hierarchies, according to embodiments of the present technology.

Flow chart 1100 includes step 1102, which includes receiving data associated with nodes of two or more hierarchies, wherein nodes are associated with original node values. The data associated with nodes of the two or more hierarchies may be generated (or loaded from memory/storage) by the system implementing the method instead of being received from a different entity. The data may include information about nodes within the hierarchies, including information about levels within the hierarchy and node values for nodes within each level of the hierarchy.

Flow chart 1100 also includes step 1104, which includes identifying a common level node and a target level node for each of the hierarchies. As noted, a common level may be the lowest level of the hierarchy (e.g. that is associated with the lowest level actions of the organization, such as selling a product in a retail store of a retail organization). A target level may be considered to be the most accurate portion of a hierarchy, and during reconciliation the system may choose to avoid changing the node values of the target level as much as possible. In other words, even though node values within other levels within the hierarchies may be changed during reconciliation, the system may choose to perform the reconciliation so as to affect the target level node values as little as possible, or to minimize the impact on the target level during reconciliation.

Flow chart 1100 also includes step 1106, which includes identifying a linking constraint, wherein the linking constraint includes a rule to adjust a node from a planning hierarchy to make it consistent with a node from another planning hierarchy. A linking constraint, or rule, may include equalizing a common level of each of multiple hierarchies being reconciled. Step 1108 then includes applying the linking constraint to the common level node of each of the hierarchies, wherein applying the linking constraint includes generating updated common node values associated with the common level nodes, and wherein updated common node values are the same node values. When applying a linking constraint, such as one to equalize the common levels of the multiple hierarchies, the node values of the nodes within the operational levels of the hierarchies may be adjusted (either one or both of the operational levels). Such changes in the operational level node values may also affect node values for other levels within the hierarchies.

Flow chart 1100 also includes step 1110, which includes applying the updated common node values to the target level node of each of the hierarchies, wherein applying the updated common node values includes generating updated target node values. After the common node level values are brought into alignment across multiple hierarchies, and the common node values of one or more of the hierarchies are therefore changed, node values within other levels of the one or more hierarchies may also be changed. In other words, a change in one level of a hierarchy may cause changes to be brought throughout one or more other levels of the hierarchies.

Flow chart 1100 also includes step 1112, which includes generating a resolved planning hierarchy using the updated target node values. Once the linking constraint or constraints are applied to the multiple hierarchies, and the hierarchies have been reconciled, the system may generate a hierarchy (e.g. demand plan) that represents both hierarchies. After such a planning hierarchy is generated, it may be written or stored to memory or storage.

In some examples described herein, the systems and methods may include data transmissions conveyed via networks (e.g., local area network, wide area network, Internet, or combinations thereof, etc.), fiber optic medium, carrier waves, wireless networks, etc. for communication with one or more data processing devices. The data transmissions can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, removable memory, flat files, temporary memory, databases, programming data structures, programming variables, IF-THEN (or similar type) statement constructs, etc.). It is noted that data structures may describe formats for use in organizing and storing data in databases, programs, memory, or other computer-readable media for use by a computer program.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. The processes and logic flows and figures described and shown in this specification can be performed by one or more programmable processors executing one or more computer programs to perform functions by operating on input data and generating output.

Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a tablet, a mobile viewing device, a mobile audio player, a Global Positioning System (GPS) receiver, to name just a few. Computer readable media suitable for storing computer program instructions and data include all forms of nonvolatile memory, media and memory devices, including by way of semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components or functionality may be located on a single computer or distributed across multiple computers depending upon the situation at hand.

The computer may include a programmable machine that performs high-speed processing of numbers, as well as of text, graphics, symbols, and sound. The computer can process, generate, or transform data. The computer includes a central processing unit that interprets and executes instructions; input devices, such as a keyboard, keypad, or a mouse, through which data and commands enter the computer; memory that enables the computer to store programs and data; and output devices, such as printers and display screens, that show the results after the computer has processed, generated, or transformed data.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

The methods, systems, devices, implementations, and embodiments discussed above are examples. Various configurations may omit, substitute, or add various procedures or components as appropriate. For instance, in alternative configurations, the methods may be performed in an order different from that described, or various stages may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session.

Specific details are given in the description to provide a thorough understanding of examples of configurations (including implementations). However, configurations may be practiced without these specific details. For example, well-known circuits, processes, algorithms, structures, and techniques have been shown without unnecessary detail in order to avoid obscuring the configurations. This description provides examples of configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several examples of configurations, various modifications, alternative constructions, and equivalents may be used without departing from the spirit of the disclosure. For example, the above elements may be components of a larger system, wherein other rules may take precedence over or otherwise modify the application of the current disclosure. Also, a number of operations may be undertaken before, during, or after the above elements are considered. Accordingly, the above description does not bound the scope of the claims.

The use of "capable of", "adapted to", or "configured to" herein is meant as open and inclusive language that does not foreclose devices adapted to or configured to perform additional tasks or operations. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some systems may use the SAS® LASR™ Analytic Server in order to deliver statistical modeling and machine learning capabilities in a highly interactive programming environment, which may enable multiple users to concurrently manage data, transform variables, perform exploratory analysis, build and compare models and score. Some systems may use SAS In-Memory Statistics for Hadoop® to read big data once and analyze it several times by persisting it in-memory for the entire session. Some systems may be of other types, designs and configurations.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations or additions to the present subject matter as may be readily apparent to one of ordinary skill in the art.

While this disclosure may contain many specifics, these should not be construed as limitations on the scope or of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software or hardware product or packaged into multiple software or hardware products.

What is claimed is:

1. A computer-program product tangibly embodied in a non-transitory machine-readable storage medium, including instructions configured to cause a data processing apparatus to perform operations including:
   receiving data associated with nodes of a first hierarchy and a second hierarchy separate from the first hierarchy, wherein the first and second hierarchies each include data associated with forecasting needs of an organization, and wherein the first hierarchy and second hierarchy each include a plurality of levels and one or more nodes on each level of the plurality of levels;
   identifying a common level and a target level for the first hierarchy and identify a common level and a target level for the second hierarchy;
   identifying a linking constraint, wherein the linking constraint includes a rule to adjust values at a node from a level in the first hierarchy to make it consistent with values at a node from a corresponding level in the second hierarchy, wherein the rule limits how values at nodes in the first and second hierarchies may be changed;
   generating an optimized first hierarchy and an optimized second hierarchy using the first hierarchy, the second hierarchy, and the linking constraint, wherein generating the optimized first hierarchy and the optimized second hierarchy includes:
      generating first updated common node values associated with nodes in the common level of the first hierarchy using the linking constraint and generating second updated common node values associated with nodes in the common level of the second hierarchy using the linking constraint, wherein the first updated common node values and the second updated common node values are a same set of values, and wherein the first updated common node values and second updated common node values are generated to minimize changes in first updated target node values associated with nodes in the target level of the first hierarchy and second updated target node values associated with nodes in the target level of the second hierarchy;
      updating, using the first updated common node values, values associated with nodes in the target level of the first hierarchy to generate the first updated target node values and updating, using the second updated common node values, values associated with nodes in the target level of the second hierarchy to generate the second updated target node values; and
   generating a resolved hierarchy using the optimized first hierarchy and the optimized second hierarchy, wherein the resolved hierarchy includes more accurate data for forecasting the needs of the organization as compared to the first hierarchy and the second hierarchy.

2. The computer-program product of claim 1, wherein the updated common node values have a same value as a value of one of the nodes in the common level before the linking constraint is applied to the common level node of each of the hierarchies.

3. The computer-program product of claim 1, further comprising instructions configured to cause the data processing apparatus to perform operations including:
   computing a change in a target node value associated with each of the first and second hierarchies;
   determining that the change in the target node value associated with one or more of the first and second hierarchies are above a predetermined threshold; and
   re-applying the linking constraint to the common level node of each of the first and second hierarchies, wherein applying the linking constraint includes generating alternative common node values associated with the nodes in the common level, wherein the alternative common node values are a same set of node values, and wherein the alternative common node values are different than the updated target node values.

4. The computer-program product of claim 1, wherein a node in the target level of a hierarchy includes a most accurate data of all nodes within the hierarchy.

5. The computer-program product of claim 1, wherein applying a linking constraint to common level nodes forces common level node values associated with the common level nodes to be the same value.

6. The computer-program product of claim 1, further comprising instructions configured to cause the data processing apparatus to perform operations including:
   computing disaggregation factors for each of the nodes of two or more hierarchies; and
   determining, using the disaggregation factors for a parent node in a hierarchy, whether a set of child nodes of the parent node comply with flow conservation properties, wherein determining whether a set of child nodes of the parent node comply with flow conservation properties includes determining if a sum of the node values of the child nodes equals the node value of the parent node.

7. The computer-program product of claim 6, wherein determining that the sum of the node values of the child nodes does not equal the node value of the parent node includes comparing the difference between the sum of the node values of the child nodes and the node value of the parent node to a predetermined threshold.

8. The computer-program product of claim 6, further comprising instructions configured to cause the data processing apparatus to perform operations including:
   determining that the set of child nodes of the parent node comply with flow conservation properties if the difference between the sum of the node values of the child nodes and the node value of the parent node are less than the predetermined threshold.

9. A computing device, comprising:
   one or more processors; and
   a memory having instructions stored thereon, which when executed by the one or more processors, cause the computing device to perform operations including:
   receiving data associated with nodes of a first hierarchy and a second hierarchy separate from the first hierarchy, wherein the first and second hierarchies each include data associated with forecasting needs of an organization, and wherein the first hierarchy and second hierarchy each include a plurality of levels and one or more nodes on each level of the plurality of levels;
   identifying a common level and a target level for the first hierarchy and identify a common level and a target level for the second hierarchy;
   identifying a linking constraint, wherein the linking constraint includes a rule to adjust values at a node from a level in the first hierarchy to make it consistent with values at a node from a corresponding level in the second hierarchy, wherein the rule limits how values at nodes in the first and second hierarchies may be changed;
   generating an optimized first hierarchy and an optimized second hierarchy using the first hierarchy, the second hierarchy, and the linking constraint, wherein generating the optimized first hierarchy and the optimized second hierarchy includes:
      generating first updated common node values associated with nodes in the common level of the first hierarchy and generating second updated common node values associated with nodes in the common level of the second hierarchy, wherein the first updated common node values and the second updated common node values are a same and wherein the first updated common node values and second updated common node values are generated to minimize changes in first updated target node values associated with nodes in the target level of the first hierarchy and second updated target node values associated with nodes in the target level of the second hierarchy;
      updating, using the first updated common node values, values associated with nodes in the target level of the first hierarchy to generate the first updated target node values and updating, using the second updated common node values, values associated with nodes in the target level of the second hierarchy to generate the second updated target node values; and
   generating a resolved hierarchy using the optimized first hierarchy and the optimized second hierarchy, wherein the resolved hierarchy includes more accurate data for forecasting the needs of the organization as compared to the first hierarchy and the second hierarchy.

10. The computing device of claim 9, wherein the updated common node values have a same value as a value of one of the nodes in the common level before the linking constraint is applied to the common level node of each of the hierarchies.

11. The computing device of claim 9, further comprising instructions, which when executed by the one or more processors, cause the computing device to perform operations including:
   computing a change in a target node value associated with each of the first and second hierarchies;
   determining that the change in the target node value associated with one or more of the first and second hierarchies are above a predetermined threshold; and
   re-applying the linking constraint to the common level node of each of the first and second hierarchies, wherein applying the linking constraint includes generating alternative common node values associated with the nodes in the common level, wherein the alternative common node values are a same set of node values, and wherein the alternative common node values are different than the updated target node values.

12. The computing device of claim 9, wherein a node in the target level of a hierarchy includes a most accurate data of all nodes within the hierarchy.

13. The computing device of claim 9, wherein applying a linking constraint to common level nodes forces common level node values associated with the common level nodes to be the same value.

14. The computing device of claim 9, further comprising instructions, which when executed by the one or more processors, cause the computing device to perform operations including:
   computing disaggregation factors for each of the nodes of two or more hierarchies; and
   determining, using the disaggregation factors for a parent node in a hierarchy, whether a set of child nodes of the parent node comply with flow conservation properties, wherein determining whether a set of child nodes of the parent node comply with flow conservation properties includes determining if a sum of the node values of the child nodes equals the node value of the parent node.

15. The computing device of claim 14, wherein determining that the sum of the node values of the child nodes does not equal the node value of the parent node includes comparing the difference between the sum of the node values of the child nodes and the node value of the parent node to a predetermined threshold.

16. The computing device of claim 15, further comprising instructions, which when executed by the one or more processors, cause the computing device to perform operations including:
   determining that the set of child nodes of the parent node comply with flow conservation properties if the difference between the sum of the node values of the child nodes and the node value of the parent node are less than the predetermined threshold.

17. A computer implemented method, comprising:
   receiving data associated with nodes of a first hierarchy and a second hierarchy separate from the first hierarchy, wherein the first and second hierarchies each include data associated with forecasting needs of an organization, and wherein the first hierarchy and second hierarchy each include a plurality of levels and one or more nodes on each level of the plurality of levels;
   identifying a common level and a target level for the first hierarchy and identify a common level and a target level for the second hierarchy;
   identifying a linking constraint, wherein the linking constraint includes a rule to adjust values at a node from a level in the first hierarchy to make it consistent with values at a node from a corresponding level in the second hierarchy, wherein the rule limits how values at nodes in the first and second hierarchies may be changed;

generating an optimized first hierarchy and an optimized second hierarchy using the first hierarchy, the second hierarchy, and the linking constraint, wherein generating the optimized first hierarchy and the optimized second hierarchy includes:

generating first updated common node values associated with nodes in the common level of the first hierarchy and generating second updated common node values associated with nodes in the common level of the second hierarchy, wherein the first updated common node values and the second updated common node values are a same values, and wherein the first updated common node values and second updated common node values are generated to minimize changes in first updated target node values associated with nodes in the target level of the first hierarchy and second updated target node values associated with nodes in the target level of the second hierarchy;

updating, using the first updated common node values, values associated with nodes in the target level of the first hierarchy to generate the first updated target node values and updating, using the second updated common node values, values associated with nodes in the target level of the second hierarchy to generate the second updated target node values; and generating a resolved hierarchy using the optimized first hierarchy and the optimized second hierarchy, wherein the resolved hierarchy includes more accurate data for forecasting the needs of the organization as compared to the first hierarchy and the second hierarchy.

18. The method of claim 17, wherein the updated common node values have a same value as a value of one of the nodes in the common level before the linking constraint is applied to the common level node of each of the hierarchies.

19. The method of claim 17, further comprising:
computing a change in target node value associated with each of the first and second hierarchies;
determining that the change in the target node value associated with one or more of the first and second hierarchies are above a predetermined threshold; and
re-applying the linking constraint to the common level node of each of the first and second hierarchies, wherein applying the linking constraint includes generating alternative common node values associated with the nodes in the common level, wherein the alternative common node values are a same set of node values, and wherein the alternative common node values are different than the updated target node values.

20. The method of claim 17, wherein a node in the target level of a hierarchy includes a most accurate data of all nodes within the hierarchy.

21. The method claim 17, wherein applying a linking constraint to common level nodes forces common level node values associated with the common level nodes to be the same value.

22. The method of claim 17, further comprising:
computing disaggregation factors for each of the nodes of two or more hierarchies; and
determining, using the disaggregation factors for a parent node in a hierarchy, whether a set of child nodes of the parent node comply with flow conservation properties, wherein determining whether a set of child nodes of the parent node comply with flow conservation properties includes determining if a sum of the node values of the child nodes equals the node value of the parent node.

23. The computer-program product of claim 22, wherein determining that the sum of the node values of the child nodes does not equal the node value of the parent node includes comparing the difference between the sum of the node values of the child nodes and the node value of the parent node to a predetermined threshold.

24. The computer-program product of claim 22, further comprising:
determining that the set of child nodes of the parent node comply with flow conservation properties if the difference between the sum of the node values of the child nodes and the node value of the parent node are less than the predetermined threshold.

* * * * *

UNITED STATES PATENT AND TRADEMARK OFFICE
CERTIFICATE OF CORRECTION

PATENT NO. : 9,892,370 B2
APPLICATION NO. : 14/750886
DATED : February 13, 2018
INVENTOR(S) : Victor H. Richard, Christian Haxholdt and Glenn Good It is certified that error appears in the above-identified patent and that said Letters Patent is hereby corrected as shown below:

In the Claims

Claim 9, Column 21, Line 43, please delete "updated common node values are a same and" and insert --updated common node values are a same values, and--

Signed and Sealed this
Tenth Day of April, 2018

Andrei Iancu
*Director of the United States Patent and Trademark Office*